US011830169B2

(12) United States Patent
Kamio et al.

(10) Patent No.: US 11,830,169 B2
(45) Date of Patent: Nov. 28, 2023

(54) IMAGE BLUR CORRECTING DEVICE, LENS DEVICE, AND IMAGING DEVICE

(71) Applicant: FUJIFILM Corporation, Tokyo (JP)

(72) Inventors: Keito Kamio, Saitama (JP); Kazuaki Okamori, Saitama (JP); Shinichiro Fujiki, Saitama (JP); Ryosuke Nagami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 434 days.

(21) Appl. No.: 17/221,161

(22) Filed: Apr. 2, 2021

(65) Prior Publication Data

US 2021/0224958 A1 Jul. 22, 2021

Related U.S. Application Data

(63) Continuation of application No. PCT/JP2019/041488, filed on Oct. 23, 2019.

(30) Foreign Application Priority Data

Nov. 21, 2018 (JP) ................................ 2018-218312

(51) Int. Cl.
*G06T 5/00* (2006.01)
*H04N 23/68* (2023.01)
(52) U.S. Cl.
CPC ............ *G06T 5/003* (2013.01); *H04N 23/683* (2023.01); *H04N 23/687* (2023.01); *G06T 2207/20201* (2013.01)
(58) Field of Classification Search
CPC .......... G06T 5/003; G06T 2207/20201; H04N 23/683; H04N 23/687; H04N 23/55; G03B 5/00
See application file for complete search history.

(56) References Cited

U.S. PATENT DOCUMENTS 8,073,317 B2 * 12/2011 Kitano ................. G02B 27/646
359/554
10,790,736 B2 * 9/2020 Kawanabe ............... G03B 5/00
(Continued)

FOREIGN PATENT DOCUMENTS

JP 2000-075335 A 3/2000
JP 2000-258813 A 9/2000
(Continued)

OTHER PUBLICATIONS

International Search Report issued in PCT/JP2019/041488; dated Jan. 28, 2020.
(Continued)

*Primary Examiner* — Xuemei G Chen
(74) *Attorney, Agent, or Firm* — Studebaker & Brackett PC

(57) ABSTRACT

Provided are an image blur correcting device that capable of improving a degree of freedom in design and realizing miniaturization or weight reduction, a lens device including the image blur correcting device, and an imaging device including the lens device. An image blur correcting device includes a fixing member, a first movable member that is supported by the fixing member in a state of being movable in a direction X, and a second movable member that is supported by the first movable member in a state of being movable in a direction Y A second coil that drives the second movable member is fixed to one first surface of the second movable member in a direction Z, and a first coil that drives the first movable member is fixed to the other second surface of the second movable member in the direction Z.

19 Claims, 20 Drawing Sheets

(56) References Cited

U.S. PATENT DOCUMENTS

| | | | |
|---|---|---|---|
| 11,520,118 B2* | 12/2022 | Konuma | G03B 5/02 |
| 2006/0007320 A1 | 1/2006 | Seo | |
| 2008/0292296 A1* | 11/2008 | Ryu | H04N 23/68 |
| | | | 348/208.4 |
| 2010/0091120 A1* | 4/2010 | Nagata | H04N 23/687 |
| | | | 359/557 |
| 2010/0149354 A1* | 6/2010 | Makimoto | H04N 23/687 |
| | | | 359/557 |
| 2010/0178044 A1 | 7/2010 | Ohno | |
| 2010/0215352 A1* | 8/2010 | Yamamoto | G03B 17/00 |
| | | | 396/55 |
| 2010/0226631 A1 | 9/2010 | Nakayama | |
| 2011/0001835 A1* | 1/2011 | Awazu | H04N 23/687 |
| | | | 348/208.7 |
| 2011/0141565 A1* | 6/2011 | Suzuka | G02B 27/646 |
| | | | 359/557 |
| 2011/0317987 A1 | 12/2011 | Nakayama | |
| 2013/0314792 A1* | 11/2013 | Hu | G02B 7/04 |
| | | | 359/557 |
| 2014/0211064 A1* | 7/2014 | Sasaki | G03B 5/06 |
| | | | 359/813 |
| 2014/0218551 A1* | 8/2014 | Muramatsu | G03B 5/02 |
| | | | 348/208.6 |
| 2015/0373272 A1* | 12/2015 | Lim | H04N 23/687 |
| | | | 348/208.11 |
| 2016/0050373 A1* | 2/2016 | Nakamura | G03B 5/02 |
| | | | 348/208.11 |
| 2017/0199392 A1* | 7/2017 | Zhou | G02B 27/646 |
| 2017/0285361 A1* | 10/2017 | Ito | G02B 27/646 |
| 2018/0010903 A1* | 1/2018 | Takao | G01S 7/4816 |
| 2018/0129064 A1* | 5/2018 | Ichihashi | G02B 27/646 |
| 2018/0184209 A1* | 6/2018 | Zhu | H04R 9/06 |
| 2018/0364443 A1* | 12/2018 | Awazu | G02B 27/646 |
| 2018/0364495 A1* | 12/2018 | Awazu | G02B 23/02 |
| 2019/0064475 A1* | 2/2019 | Kobayashi | G03B 13/34 |
| 2019/0103798 A1* | 4/2019 | Kawanabe | G02B 27/646 |
| 2019/0191092 A1* | 6/2019 | Imanishi | G02B 27/646 |
| 2019/0238728 A1* | 8/2019 | Hwang | H04N 23/57 |
| 2019/0265432 A1* | 8/2019 | Kawanabe | G02B 7/003 |
| 2019/0271825 A1* | 9/2019 | Kawanabe | G02B 7/02 |
| 2021/0173175 A1* | 6/2021 | Itagaki | H04N 23/54 |

FOREIGN PATENT DOCUMENTS

| | | | |
|---|---|---|---|
| JP | 2006-023664 A | | 1/2006 |
| JP | 2007-011222 A | | 1/2007 |
| JP | 2008-051927 A | | 3/2008 |
| JP | 2010-204477 A | | 9/2010 |
| JP | 2011113053 A | * | 6/2011 |
| JP | 2011-248010 A | | 12/2011 |
| JP | 2012-008312 A | | 1/2012 |

OTHER PUBLICATIONS

Written Opinion issued in PCT/JP2019/041488; dated Jan. 28, 2020.

* cited by examiner

IMAGE BLUR CORRECTING DEVICE, LENS DEVICE, AND IMAGING DEVICE

CROSS-REFERENCE TO RELATED APPLICATIONS

This application is a Continuation of PCT International Application No. PCT/JP2019/041488 filed on Oct. 23, 2019, which claims priority under 35 U.S.C § 119(a) to Japanese Patent Application No. 2018-218312 filed on Nov. 21, 2018. Each of the above application(s) is hereby expressly incorporated by reference, in its entirety, into the present application.

BACKGROUND OF THE INVENTION

1. Field of the Invention

The present invention relates to an image blur correcting device, a lens device, and an imaging device.

2. Description of the Related Art

As an imaging device comprising an imaging element that images a subject through an imaging optical system, or a lens device mounted on such an imaging device, a device including an image blur correcting function that corrects a blur of a captured image (hereinafter, referred to as an image blur) caused by vibration of the device has been known.

For example, with the lens device, the image blur correction is performed by detecting a vibration of the device based on information from a movement detection sensor, such as an acceleration sensor or an angular velocity sensor, which is mounted on the lens device, by moving a correction lens included in the imaging optical system in a plane perpendicular to the optical axis to cancel the detected vibration.

Further, with the imaging device, the image blur correction is performed by detecting a vibration of the device based on information from a movement detection sensor, such as an acceleration sensor or an angular velocity sensor, which is mounted on the imaging device, by moving one or both of a correction lens and the imaging element included in the imaging optical system in a plane perpendicular to the optical axis to cancel the detected vibration.

JP2000-075335A, JP2000-258813A, and JP2012-008312A discloses a device that performs image blur correction by moving an optical axis of the lens by the movement of two movable members.

SUMMARY OF THE INVENTION

In order to correct the image blur by moving the correction lens or the imaging element in a two-dimensional manner by the two movable members, generally, one of the two movable members is supported by the fixing member and is movable in one direction, and the other of the two movable members is supported by the one movable member and is movable in a direction orthogonal to the one direction. In such a configuration, it is necessary to dispose a guide shaft that guides the movement of each of the two movable members, and a driving coil or a driving magnet that is fixed to at least one of the two movable members and generates a propulsive force for moving the two movable members such that the guide shaft and the driving coil or the driving magnet do not interfere with each other.

In particular, as the size of the imaging element or the imaging optical system is increased, the weight of the movable member is also increased depending on the size thereof. As described above, in a case in which the weight of the movable member is increased, it is necessary to increase the thickness of the driving coil and the driving magnet in the optical axis direction to secure the propulsive force for moving the movable member. Further, in order to avoid resonance of the movable member in the optical axis direction, it is necessary to match the center of gravity of the movable member in the optical axis direction with a generation source of the propulsive force. In order to satisfy these requirements, the driving coil or the driving magnet may be configured to protrude to one side from a surface of the movable member. Further, even in a case in which the distance between the driving coil and the driving magnet is to be reduced to increase the propulsive force, the driving coil or the driving magnet may be configured to protrude to one side from the surface of the movable member. In these cases, it is necessary to avoid interference between the protruding portion of the driving coil or the driving magnet and the guide shaft or the like, so that the degree of freedom in design of the image blur correcting device is decreased. In JP2000-075335A, JP2000-258813A, and JP2012-008312A, the problem in a case in which the driving coil or the driving magnet may protrude from the movable member is not recognized.

The present invention has been made in view of the above circumstances, and is to provide an image blur correcting device that capable of improving a degree of freedom in design and realizing miniaturization or weight reduction, a lens device comprising the image blur correcting device, and an imaging device comprising the lens device.

An image blur correcting device according to an aspect of the present invention that corrects a blur of a captured image captured by an imaging element that images a subject through an imaging optical system, the device comprising a fixing member, a first movable member that is supported by the fixing member in a state of being movable in a first direction, a second movable member that is supported by the first movable member in a state of being movable in a second direction intersecting the first direction, a correction lens that is included in the imaging element fixed to the second movable member or the imaging optical system fixed to the second movable member, a first coil and a first magnet that generate a propulsive force for moving the first movable member in the first direction, and a second coil and a second magnet that generate a propulsive force for moving the second movable member in the second direction, in which, of the first movable member and the second movable member, a movable member that is relatively far from the fixing member in a third direction perpendicular to the first direction and the second direction is defined as a distant movable member, and a movable member that is relatively close to the fixing member is defined as a near movable member, the first coil or the first magnet is defined as a first drive element, and the second coil or the second magnet is defined as a second drive element, in the third direction, a surface of the distant movable member or the near movable member on an opposite side to a fixing member side is defined as a first surface of the distant movable member or the near movable member, in the third direction, a surface of the distant movable member or the near movable member on the fixing member side is defined as a second surface of the distant movable member or the near movable member, one of the first drive element and the second drive element is provided on the distant movable member or the near movable member to be closer to the fixing member side than the first surface, and the other of the first drive element and the second drive element is provided on the distant movable member or the near movable member to be closer to the opposite side to the fixing member side than the second surface.

An image blur correcting device according to another aspect of the present invention that corrects a blur of a captured image captured by an imaging element that images a subject through an imaging optical system, the device comprising a fixing member, a first movable member that is supported by the fixing member in a state of being movable in a first direction, a second movable member that is supported by the first movable member in a state of being movable in a second direction intersecting the first direction and is disposed to be closer to an opposite side to a fixing member side than the first movable member in a third direction perpendicular to the first direction and the second direction, a correction lens that is included in the imaging element fixed to the second movable member or the imaging optical system fixed to the second movable member, a first coil and a first magnet that generate a propulsive force for moving the first movable member in the first direction, and a second coil and a second magnet that generate a propulsive force for moving the second movable member in the second direction, in which the first coil or the first magnet is defined as a first drive element, and the second coil or the second magnet is defined as a second drive element, in the third direction, a surface of the second movable member on the opposite side to the fixing member side is defined as a first surface of the second movable member, in the third direction, a surface of the second movable member on the fixing member side is defined as a second surface of the second movable member, the first drive element is provided on the second movable member to be closer to the fixing member side than the first surface, and the second drive element is provided on the second movable member to be closer to the opposite side to the fixing member side than the second surface.

An image blur correcting device according to still another aspect of the present invention that corrects a blur of a captured image captured by an imaging element that images a subject through an imaging optical system, the device comprising a fixing member, a first movable member that is supported by the fixing member in a state of being movable in a first direction, a second movable member that is supported by the first movable member in a state of being movable in a second direction intersecting the first direction and is disposed to be closer to a fixing member side than the first movable member in a third direction perpendicular to the first direction and the second direction, a correction lens that is included in the imaging element fixed to the second movable member or the imaging optical system fixed to the second movable member, a first coil and a first magnet that generate a propulsive force for moving the first movable member in the first direction, and a second coil and a second magnet that generate a propulsive force for moving the second movable member in the second direction, in which the first coil or the first magnet is defined as a first drive element, and the second coil or the second magnet is defined as a second drive element, in the third direction, a surface of the second movable member on the fixing member side is defined as a second surface of the second movable member, in the third direction, a surface of the second movable member on an opposite side to the fixing member side is defined as a first surface of the second movable member, the first drive element is provided on the second movable member to be closer to the opposite side to the fixing member side than the second surface, and the second drive element is provided on the second movable member to be closer to the fixing member side than the first surface.

A lens device according to still another aspect of the present invention comprises the image blur correcting device according to above aspect.

An imaging device according to still another aspect of the present invention comprises the lens device according to the above aspect, and an imaging element that images a subject through the lens device.

According to the present invention, it is possible to provide an image blur correcting device that capable of improving a degree of freedom in design and realizing miniaturization or weight reduction, a lens device comprising the image blur correcting device, and an imaging device comprising the lens device.

DESCRIPTION OF THE PREFERRED EMBODIMENTS

Hereinafter, embodiments of the present invention will be described with reference to the drawings.

Figure 1:
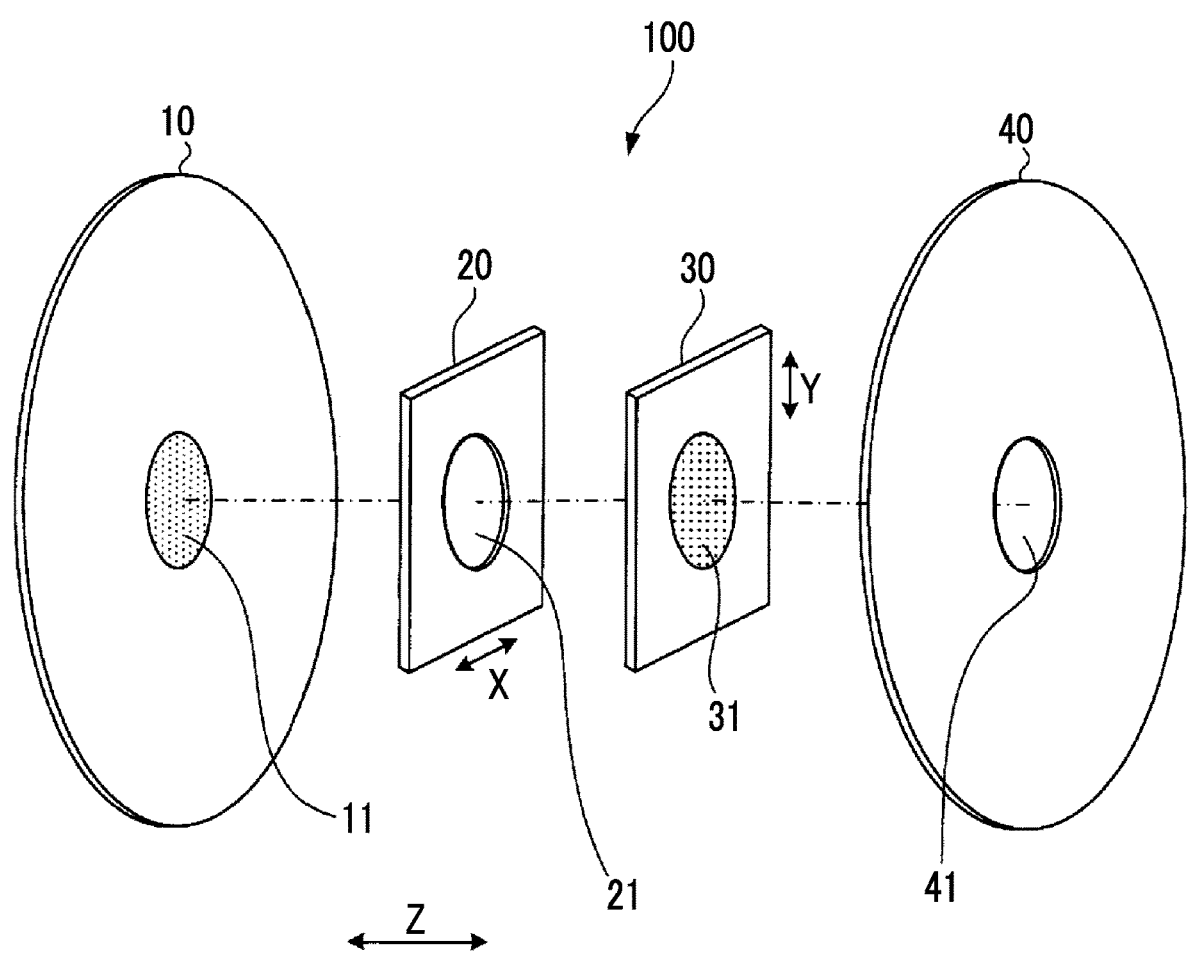
FIG. 1 is an exploded perspective view schematically showing a schematic configuration of an image blur correcting device 100 that is an image blur correcting device according to an embodiment of the present invention.

Overall Configuration of Image Blur Correcting Device According to First Embodiment FIG. 1 is an exploded perspective view schematically showing a schematic configuration of an image blur correcting device 100 that is an image blur correcting device according to an embodiment of the present invention.

The image blur correcting device 100 is a device that corrects a blur of a captured image captured by an imaging element that images a subject through an imaging optical system including a focus lens and a stop, and is used by being mounted on a lens device including the imaging optical system or an imaging device including the imaging element that images the subject through the lens device including the imaging optical system.

The image blur correcting device 100 comprises a fixing member 10, a first movable member 20, a second movable member 30, and a facing base 40. The fixing member 10, the first movable member 20, the second movable member 30, and the facing base 40 are arranged in this order along a direction Z that is an optical axis direction of the imaging optical system.

In an example of FIG. 1 having an opening on the optical axis of the imaging optical system, the fixing member 10 is an annular plate-shaped member. A lens 11 that is a part of the imaging optical system is fixed to the opening of the fixing member 10. The lens 11 in the fixing member 10 may be omitted.

The first movable member 20 is supported by the fixing member 10 in a state of being movable in a direction X perpendicular to the direction Z. In an example of FIG. 1 having an opening 21 on the optical axis of the imaging optical system, the first movable member 20 is a rectangular flat plate-shaped member.

The second movable member 30 is supported by the first movable member 20 in a state of being movable in a direction Y perpendicular to the direction Z and the direction X. In an example of FIG. 1 having an opening on the optical axis of the imaging optical system, the second movable member 30 is a rectangular flat plate-shaped member. A correction lens 31 that is a part of the imaging optical system is fixed to the opening of the second movable member 30.

The facing base 40 is a member that faces the fixing member 10 with the first movable member 20 and the second movable member 30 interposed therebetween, and is an annular plate-shaped member in an example of FIG. 1 having an opening 41 on the optical axis of the imaging optical system. The shape or the size of each of the fixing member 10, the first movable member 20, the second movable member 30, and the facing base 40 is not limited to those shown in the drawings, and can be any shape or size.

The image blur correcting device 100 is a device that, for example, allows a subject light incident from the opening 41 of the facing base 40 to pass the correction lens 31, the opening 21, and the lens 11 in this order and guides the light to the imaging element (not shown). The image blur correcting device 100 may be a device that, for example, allows a subject light incident on the lens 11 of the fixing member 10 to pass the opening 21, the correction lens 31, and the opening 41 in this order and guides the light to the imaging element (not shown).

In the image blur correcting device 100, the direction X configures a first direction, the direction Y configures a second direction, the direction Z configures a third direction, the first movable member 20 configures a near movable member, the second movable member 30 configures a distant movable member, and the facing base 40 configures a facing fixing member.

Figure 2:
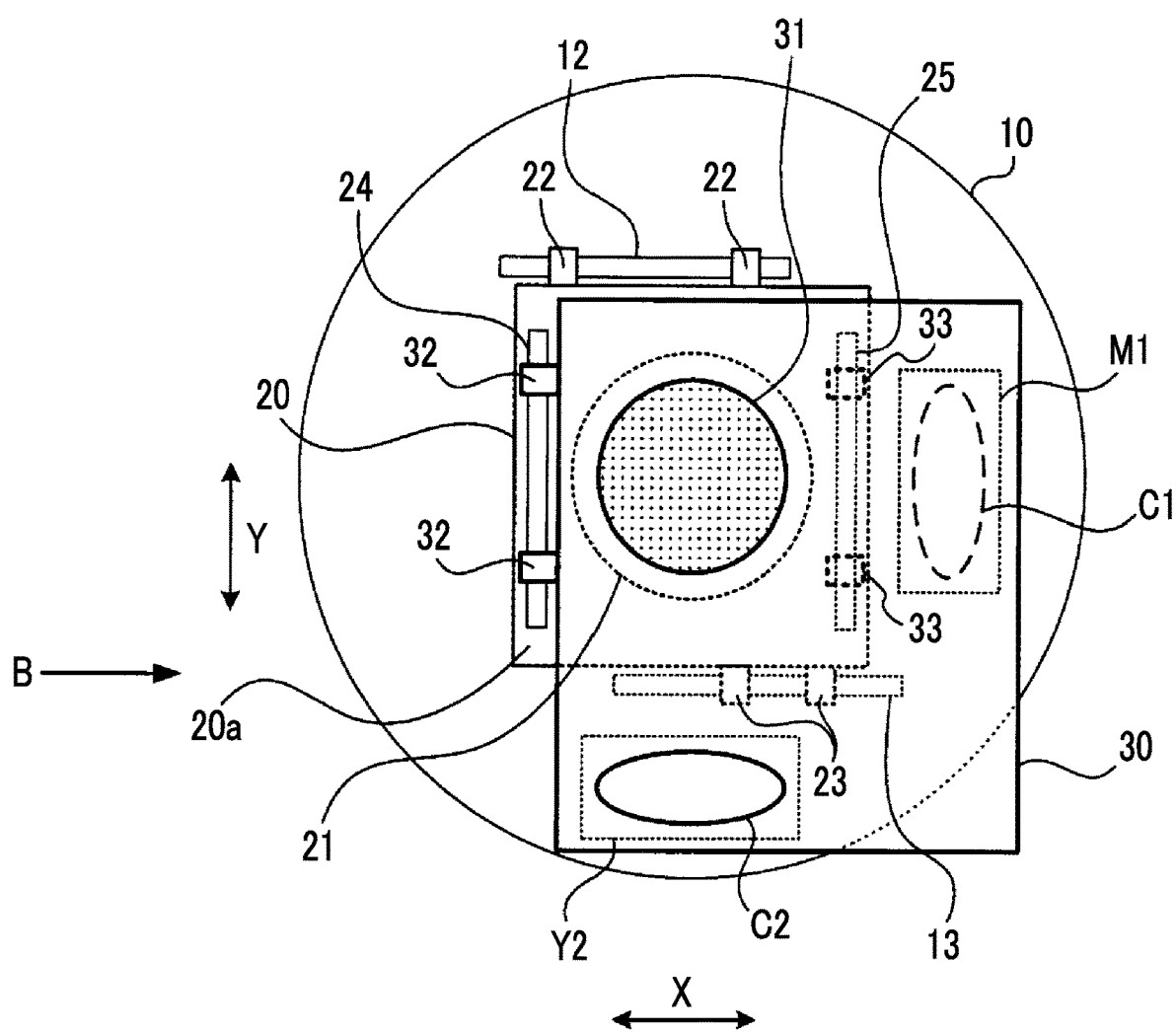
FIG. 2 is a schematic plan view of the image blur correcting device 100 of FIG. 1 as viewed in a direction Z from a facing base 40 side.

Detailed Configuration of Fixing Member, First Movable Member, Second Movable Member, and Facing Base in Image Blur Correcting Device According to First Embodiment FIG. 2 is a schematic plan view of the image blur correcting device 100 of FIG. 1 as viewed in the direction Z from the facing base 40 side. The facing base 40 is not shown in FIG. 2.

Figure 3:
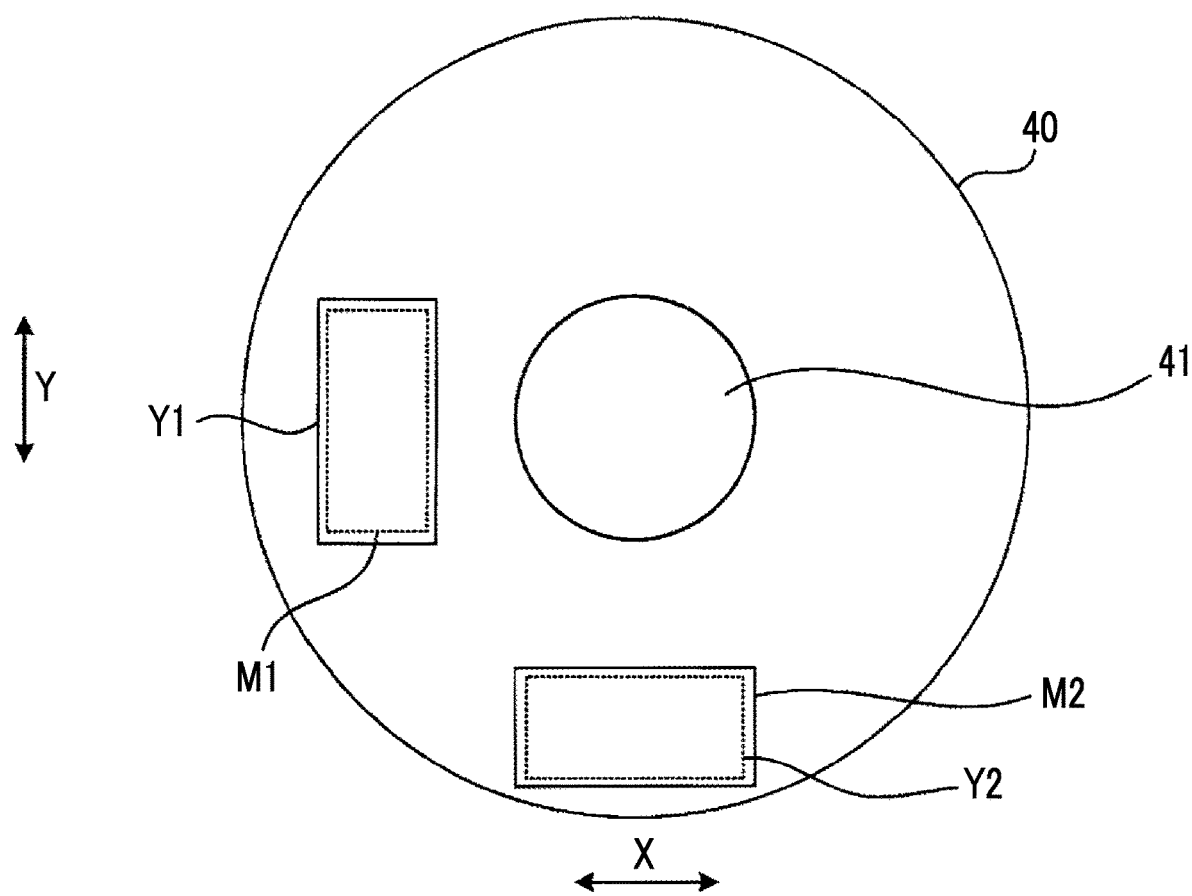
FIG. 3 is a schematic plan view of a facing base 40 in the image blur correcting device 100 of FIG. 1 as viewed in the direction Z from a second movable member 30 side.

FIG. 3 is a schematic plan view of the facing base 40 in the image blur correcting device 100 of FIG. 1 as viewed in the direction Z from the second movable member 30 side. In FIG. 3, the positions of the components (first magnet M1 and second yoke Y2 described below) provided in the fixing member 10 are shown by broken lines.

Figure 4:
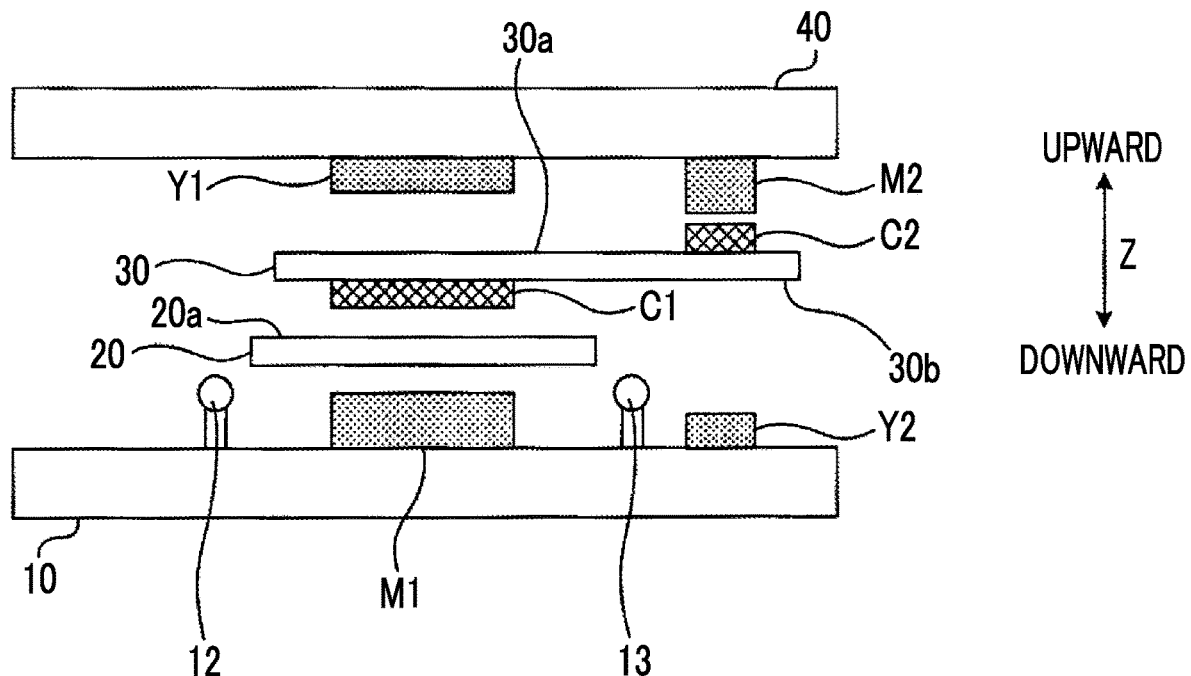
FIG. 4 is a schematic side view of the image blur correcting device 100 shown in FIG. 2 as viewed from a direction B that is one of a direction X.

FIG. 4 is a schematic side view of the image blur correcting device 100 shown in FIG. 2 as viewed from the direction B that is one of the direction X. In FIG. 4, among the components shown in FIG. 2, bearings 22 and 32, engagement portions 23 and 33, and second guide members 24 and 25, which will be described below, are not shown.

In the following, a direction from the back side to the front side of the paper surface in FIG. 2 (the direction from the fixing member 10 to the facing base 40 in FIG. 4) is referred to as an upward direction, and an opposite direction of the upward direction is referred to as a downward direction.

As shown in FIGS. 2 and 4, first guide members 12 and 13 that guide the movement of the first movable member 20 in the direction X are fixed to the fixing member 10. Each of the first guide members 12 and 13 is, for example, a columnar member that extends in the direction X, and is fixed to an upper surface of the fixing member 10 in a state of being separated from the upper surface. In the example of FIG. 2, the first guide members 12 and 13 are disposed separated from each other in the direction Y with the lens 11 (not shown in FIG. 2) of the fixing member 10 interposed therebetween.

As shown in FIG. 2, in the first movable member 20, two tubular bearings 22 into which the first guide member 12 is inserted and two engagement portions 23 for floating prevention, which engage with the first guide member 13 are provided. The first movable member 20 is configured to move in the direction X by the two bearings 22 sliding with respect to the first guide member 12.

As shown in FIGS. 2 and 4, second guide members 24 and 25 (not shown in FIG. 4) that guide the movement of the second movable member 30 in the direction Y are fixed to a first surface 20a on the upper side of the first movable member 20.

Each of the second guide members 24 and 25 is, for example, a columnar member that extends in the direction Y, and is fixed to the first surface 20a of the first movable member 20 in a state of being separated from the first surface 20a. In the example of FIG. 2, the second guide members 24 and 25 are disposed separated from each other in the direction X with the opening 21 of the first movable member 20 interposed therebetween.

As shown in FIG. 2, in the second movable member 30, two tubular bearings 32 into which the second guide member 24 is inserted and two engagement portions 33 for floating prevention, which engage with the second guide member 25 are provided. The second movable member 30 is configured to move in the direction Y by the two bearings 32 sliding with respect to the second guide member 24.

As shown in FIGS. 2 and 4, a first coil C1 that generates a propulsive force for moving the first movable member 20 in the direction X is formed on a second surface 30b on the lower side of the second movable member 30.

The first coil C1 is disposed at a position on an opposite side to the correction lens 31 side with respect to a region overlapping the second guide member 25. The upper end portion of the first coil C1 and the second surface 30b of the second movable member 30 have the same position in the direction Z. That is, the first coil C1 protrudes from the second surface 30b in the downward direction.

As shown in FIGS. 2 and 4, a second coil C2 that generates a propulsive force for moving the second movable member 30 in the direction Y is formed on a first surface 30a on the upper side of the second movable member 30.

The second coil C2 is disposed at a position on an opposite side to the opening 21 side with respect to the first guide member 13. The lower end portion of the second coil C2 and the first surface 30a of the second movable member 30 have the same position in the direction Z. That is, the second coil C2 protrudes from the first surface 30a in the upward direction.

The position of the upper end portion of the first coil C1 in the direction Z need only be lower than the position of the first surface 30a in the direction Z. Further, the position of the lower end portion of the second coil C2 in the direction Z need only be higher than the position of the second surface 30b in the direction Z. For example, as shown in FIG. 5, the first coil C1 and the second coil C2 may each have a configuration in which a part thereof is embedded in the second movable member 30.

Figure 5:
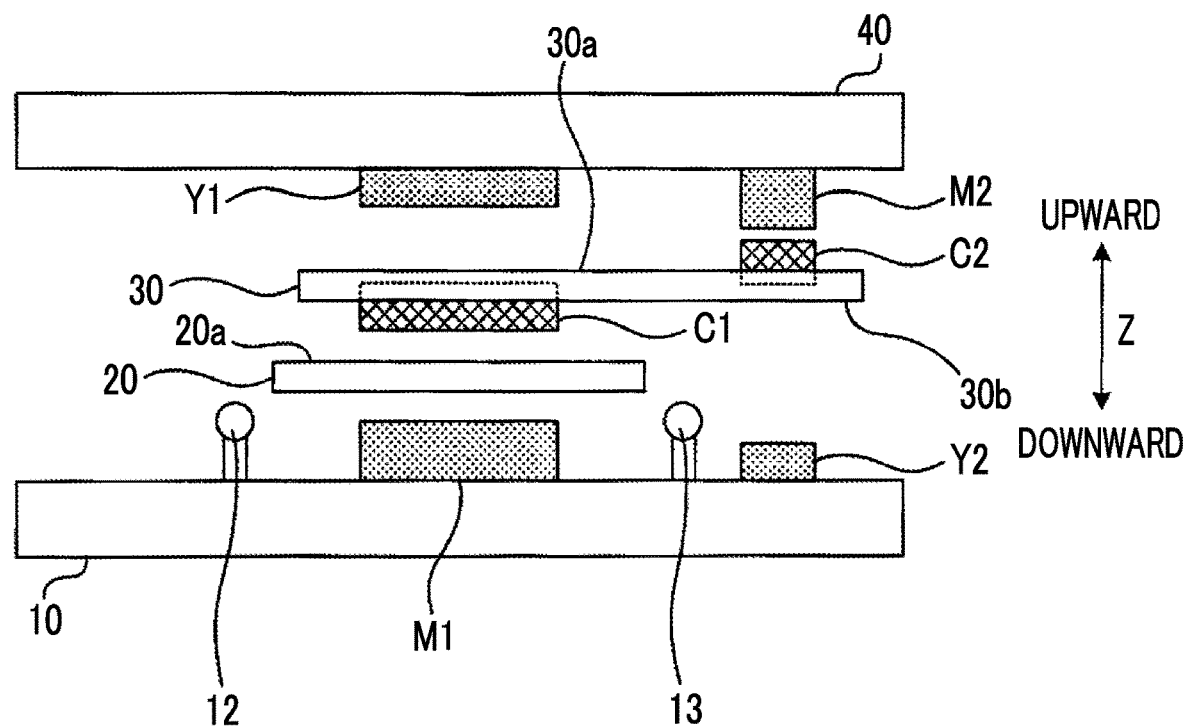
FIG. 5 is a view showing a modification example of the configuration of FIG. 4.

In FIG. 5, the upper end portion of the first coil C1 is disposed to be closer to the fixing member side than the first surface of the second movable member 30 on the opposite side to the fixing member side in the third direction, that is, the first surface 30a on the upper side of the second movable member 30. Further, the lower end portion of the second coil C2 is installed to be closer to the opposite side to the fixing member side than the second surface of the second movable member 30 on the fixing member side in the third direction, that is, the second surface 30b of the second movable member 30.

As described above, by configuring the first coil C1 and the second coil C2 to have a portion that protrudes from the second movable member 30, it is possible to increase the propulsive force for moving the first movable member 20 in the direction X and the propulsive force for moving the second movable member 30 in the direction Y while realizing reduction of the thickness of the second movable member 30 in the direction Z and weight reduction. Further, by configuring the first coil C1 and the second coil C2 to have a portion that protrudes from the second movable member 30, it is easy to match the center of gravity of the second movable member 30 in the optical axis direction and generation sources of the propulsive forces generated in the first coil C1 and the second coil C2, and it is possible to suppress the resonance of the second movable member 30 in the optical axis direction.

As shown in FIGS. 2 to 4, a first magnet M1 that generates a propulsive force for moving the first movable member 20 in the direction X is provided on the upper surface of the fixing member 10 at a position facing the first coil C1. Further, a first yoke Y1 that suppresses a magnetic flux leakage of the first magnet M1 is provided on a lower surface of the facing base 40 at a position overlapping the first magnet M1.

As shown in FIGS. 2 to 4, a second magnet M2 that generates a propulsive force for moving the second movable member 30 in the direction Y is provided on the lower surface of the facing base 40 at a position facing the second coil C2. Further, a second yoke Y2 that suppresses a magnetic flux leakage of the second magnet M2 is provided on the upper surface of the fixing member 10 at a position overlapping the second magnet M2.

A voice coil motor XVCM that drives the first movable member 20 is configured by the first coil C1, the first magnet M1, and the first yoke Y1, and a voice coil motor YVCM that drives the second movable member 30 is configured by the second coil C2, the second magnet M2, and the second yoke Y2.

In a case in which a current flows through the second coil C2, the second movable member 30 moves in the direction Y while sliding with respect to the second guide members 24 and 25. In a case in which a current flows through the first coil C1, the first movable member 20 connected to the second movable member 30 via the second guide members 24 and 25 moves in the direction X while sliding with respect to the first guide members 12 and 13.

As described above, by energizing the first coil C1 and the second coil C2, the correction lens 31 moves in the direction X and the direction Y, the image blur is corrected.

In the image blur correcting device 100, the first coil C1 configures a first drive element, and the second coil C2 configures a second drive element.

Effect of Image Blur Correcting Device According to First Embodiment

In the image blur correcting device 100 configured as described above, the first coil C1 is disposed on the lower side than the first surface 30a of the second movable member 30, and the second coil C2 is disposed on the upper side than the second surface 30b of the second movable member 30.

With this configuration, for example, it is not necessary to avoid interference between the second coil C2 and the first guide member 13, and thus the degree of freedom in design can be improved. Therefore, it is possible to realize miniaturization and weight reduction.

Further, for example, in FIG. 4, the first yoke Y1 can be disposed on the back surface of the first coil C1 on the first surface 30a of the second movable member 30, and even in a case in which the thickness of the first coil C1 in the direction Z can be slightly reduced, it is possible to obtain a sufficient propulsive force.

Further, the image blur correcting device 100 can have a configuration in which the first coil C1 is formed on the first surface 30a, the first yoke Y1 is changed to the first magnet M1, the second coil C2 is formed in the second surface 30b, and the second yoke Y2 is changed to the second magnet M2, in FIG. 4. With this configuration, it is not necessary to avoid interference between the first coil C1 and the second guide member 25, and thus the degree of freedom in design can be improved. Therefore, it is possible to realize miniaturization and weight reduction.

Figure 6:
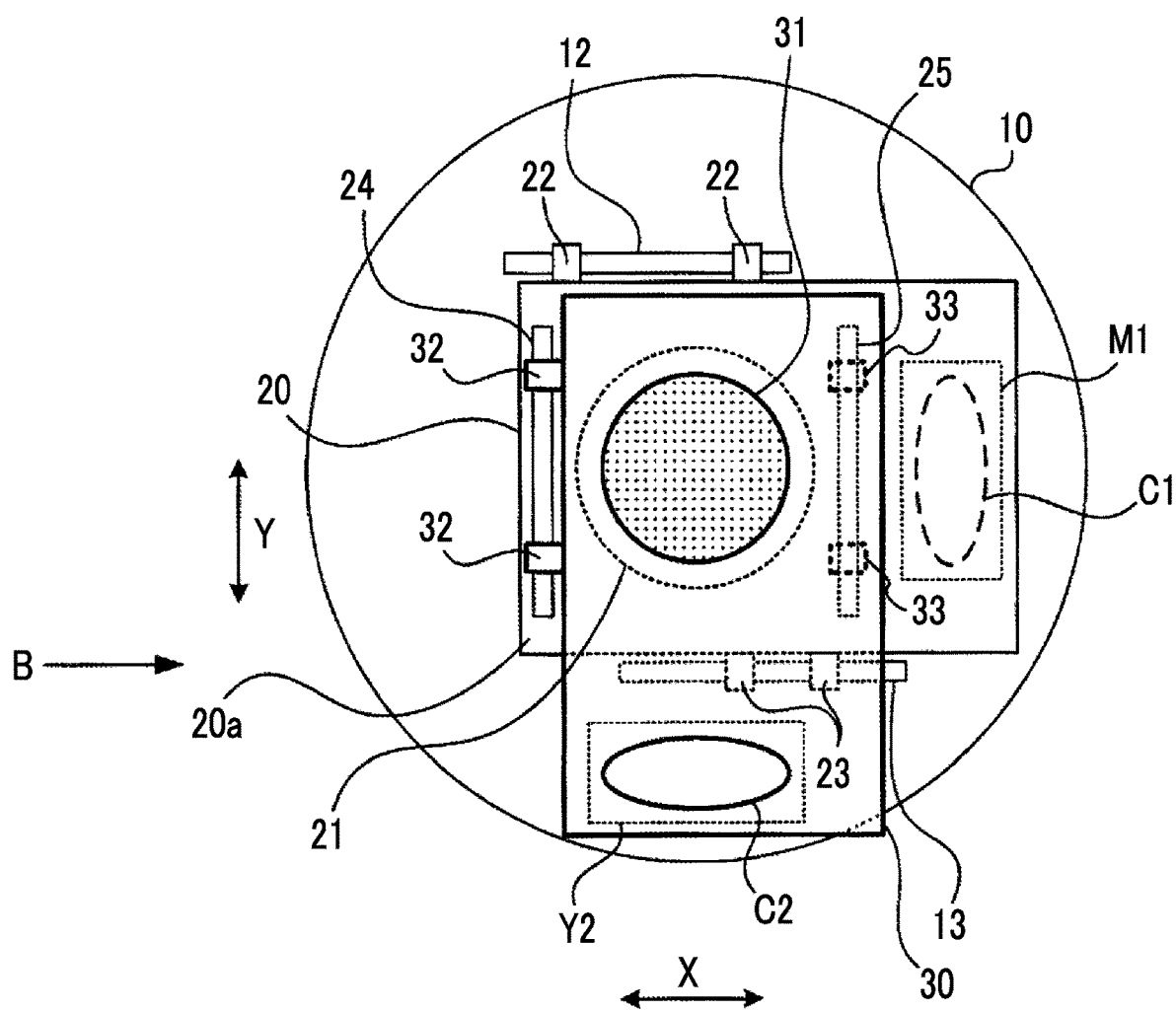
FIG. 6 is a view corresponding to FIG. 2, which shows a first modification example of the image blur correcting device 100 of FIG. 1.
Figure 7:
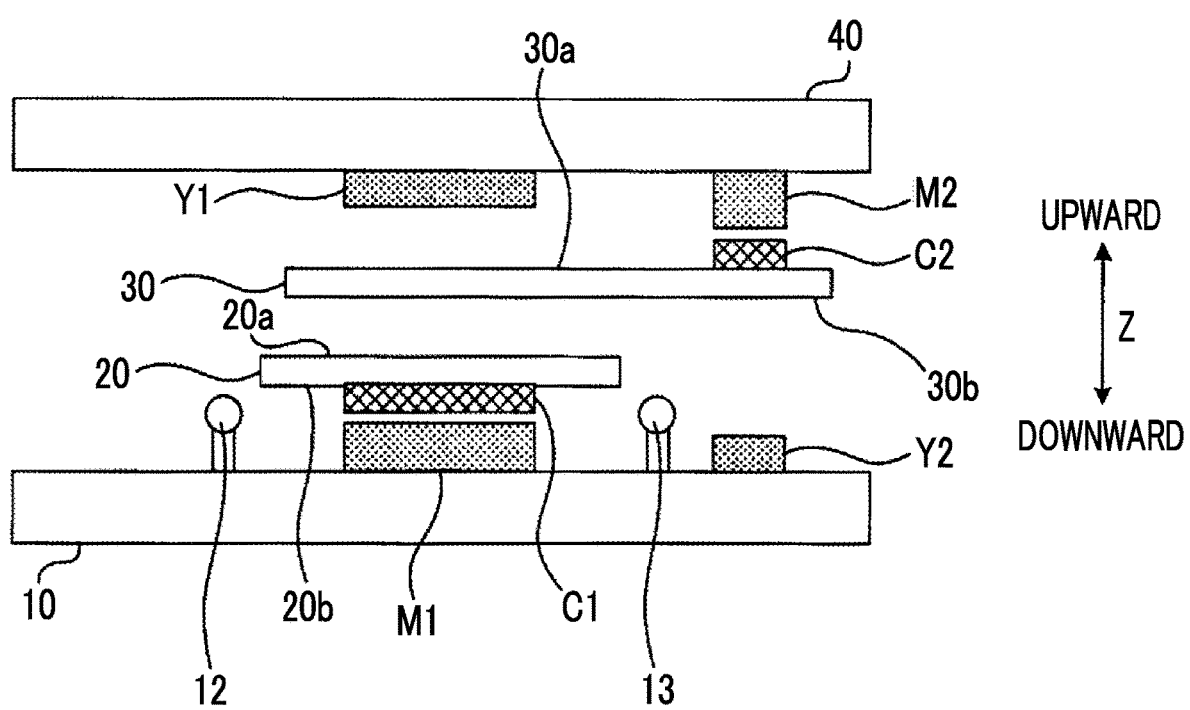
FIG. 7 is a schematic side view of the image blur correcting device 100 shown in FIG. 6 as viewed from the direction B that is one of the direction X.

First Modification Example of Image Blur Correcting Device According to First Embodiment FIG. 6 is a view corresponding to FIG. 2, which shows a first modification example of the image blur correcting device 100 of FIG. 1. FIG. 7 is a schematic side view of the image blur correcting device 100 shown in FIG. 6 as viewed from the direction B that is one of the direction X. In FIGS. 6 and 7, the same components as those of FIGS. 1 to 4 are designated by the same reference numerals.

The image blur correcting device 100 according to the first modification example shown in FIGS. 6 and 7 has the same configuration as those of FIGS. 2 and 4 except that the width of the first movable member 20 in the direction X is increased, the disposition place of the first coil C1 is changed to the second surface 20b on the lower side of the first movable member 20, and the width of the second movable member 30 in the direction X is reduced.

The image blur correcting device 100 shown in FIGS. 6 and 7 may have a configuration in which a part of the first coil C1 is embedded in the first movable member 20, and a part of the second coil C2 is embedded in the second movable member 30.

With the image blur correcting device 100 according to the first modification example, the first coil C1 is provided on the second surface 20b of the first movable member 20, and thus the space for the first coil C1 in the second movable member 30 is not necessary, and it is possible to realize miniaturization and weight reduction of the second movable member 30.

Since the heavy correction lens 31 is mounted on the second movable member 30, it is possible to realize weight reduction of the second movable member 30, and thus it is possible to obtain a sufficient propulsive force even in a case in which the thickness of the second coil C2 is reduced.

Further, by providing the first coil C1 on the second surface 20b of the first movable member 20, it is not necessary to avoid interference between the second guide member 25 and the first coil C1, and thus the degree of freedom in design can be improved. Therefore, it is possible to realize miniaturization and weight reduction.

Figure 8:
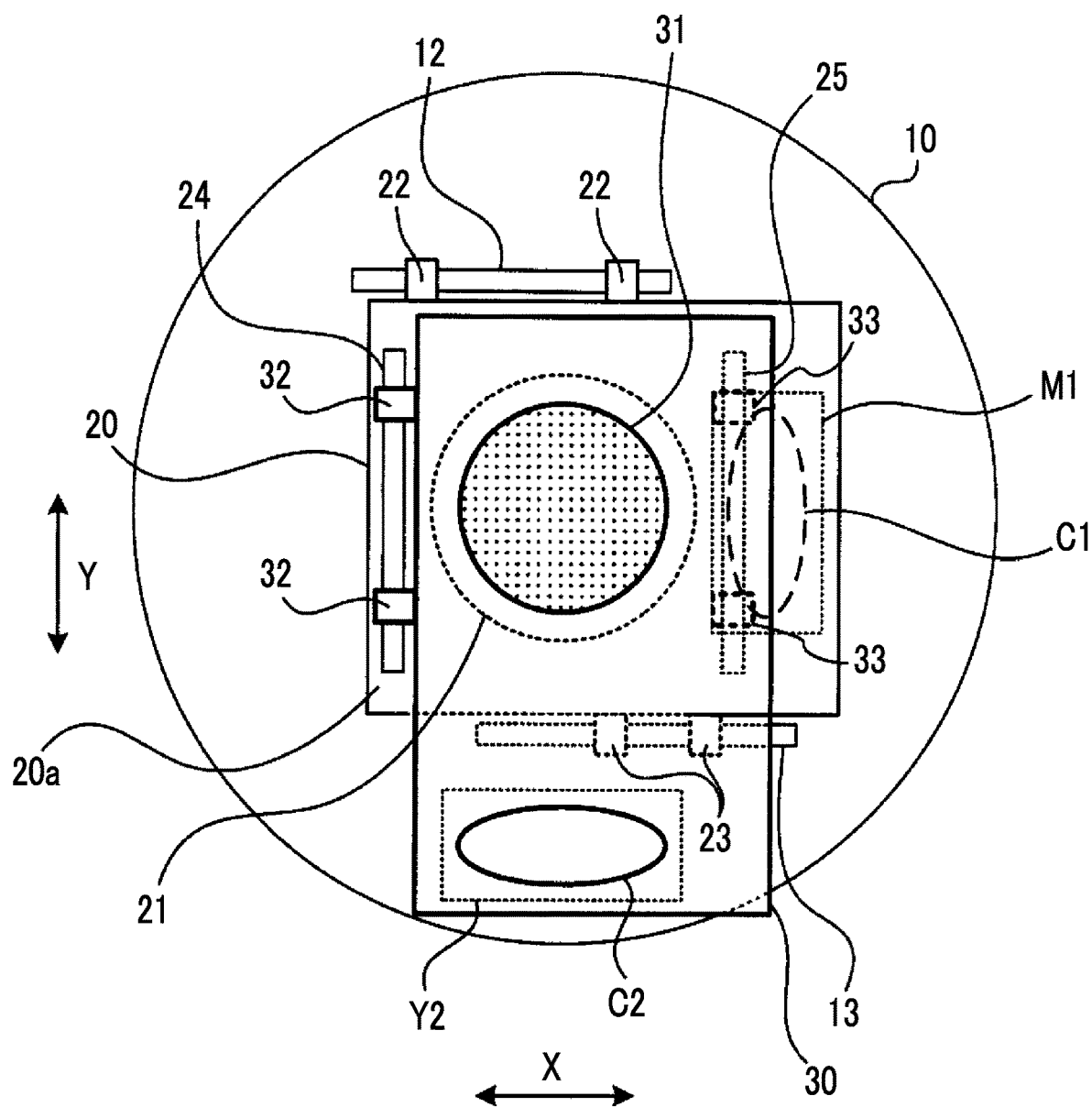
FIG. 8 is a view corresponding to FIG. 2, which shows a second modification example of the image blur correcting device 100 of FIG. 1.

Second Modification Example of Image Blur Correcting Device According to First Embodiment FIG. 8 is a view corresponding to FIG. 2, which shows a second modification example of the image blur correcting device 100 of FIG. 1. In FIG. 8, the same components as those of FIGS. 1 to 4 are designated by the same reference numerals. The image blur correcting device 100 according to the second modification example shown in FIG. 8 has the same configuration as those of FIG. 6 except that the positions of the first magnet M1 and the first coil C1 as viewed in the optical axis direction are changed to the positions overlapping the second guide member 25, and the width of the first movable member 20 in the direction X is reduced.

In the image blur correcting device 100 according to the second modification example, the first coil C1 is formed at a position overlapping the second guide member 25 as viewed in the optical axis direction. Therefore, the width of the first movable member 20 in the direction X can be reduced, and it is possible to realize miniaturization and weight reduction as compared with the image blur correcting device 100 according to the first modification example.

Figure 9:
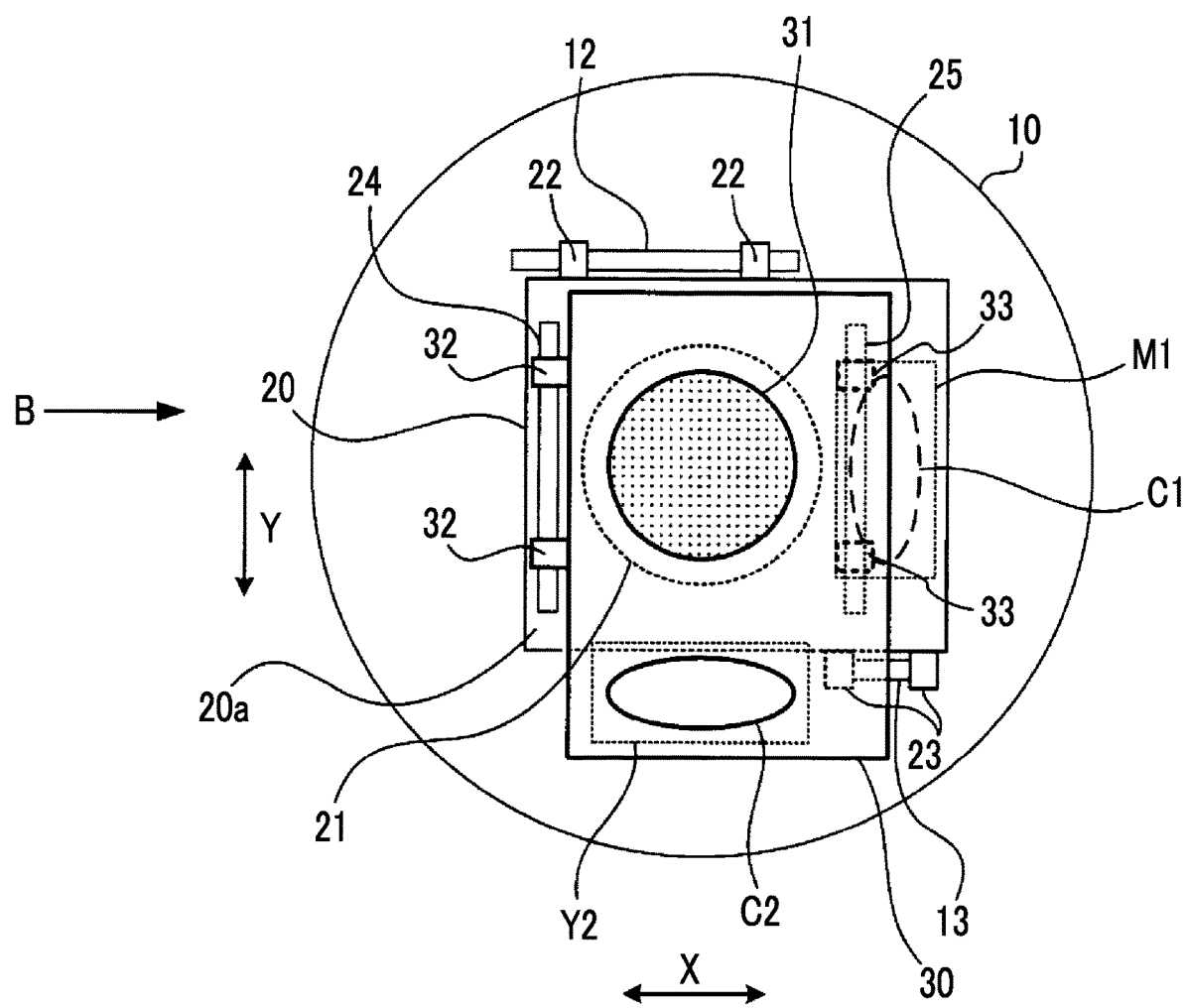
FIG. 9 is a view corresponding to FIG. 2, which shows a third modification example of the image blur correcting device 100 of FIG. 1.
Figure 10:
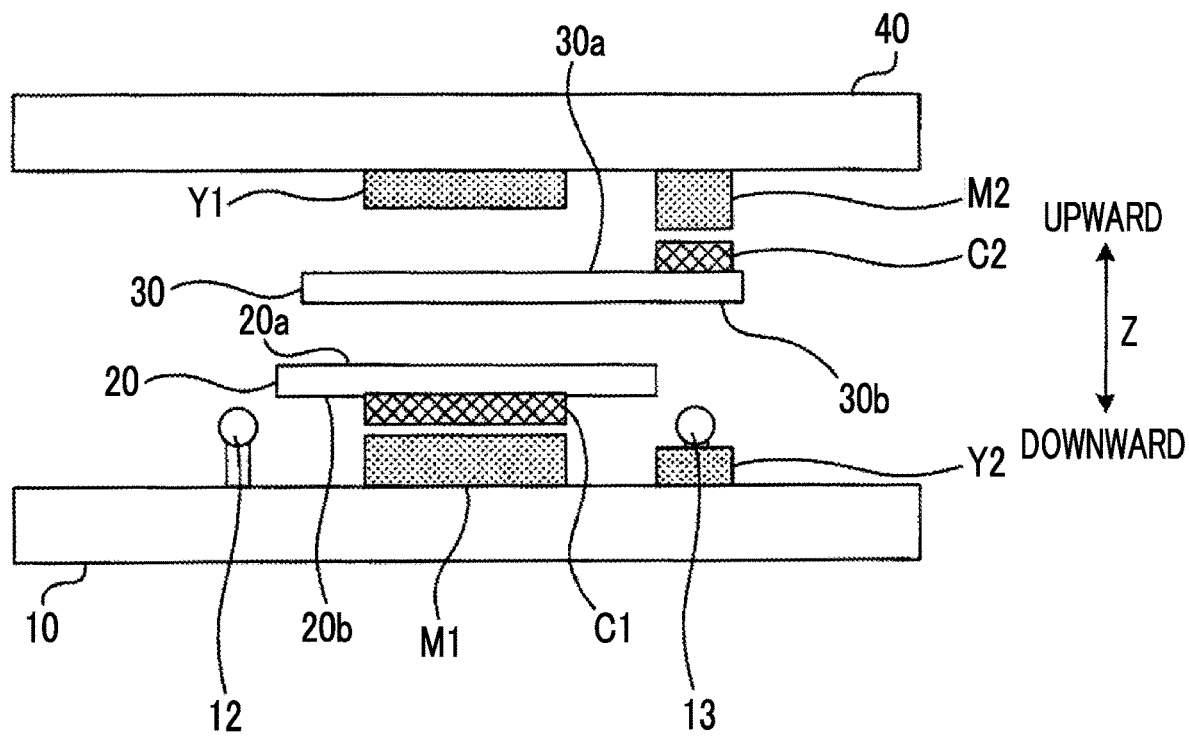
FIG. 10 is a schematic side view of the image blur correcting device 100 shown in FIG. 9 as viewed from the direction B that is one of the direction X.

Third Modification Example of Image Blur Correcting Device According to First Embodiment FIG. 9 is a view corresponding to FIG. 2, which shows a third modification example of the image blur correcting device 100 of FIG. 1. FIG. 10 is a schematic side view of the image blur correcting device 100 shown in FIG. 9 as viewed from the direction B that is one of the direction X. In FIGS. 9 and 10, the same components as those of FIGS. 1 to 4 are designated by the same reference numerals.

The image blur correcting device 100 according to the third modification example shown in FIGS. 9 and 10 has the same configuration as those of FIG. 8 except that the position of the first guide member 13 is moved to the right side, the second coil C2, the second magnet M2, and the second yoke Y2 are moved to the position next to the first guide member 13 in the direction X in a plan view of FIG. 9, and the width of the second movable member 30 in the direction Y is reduced.

With the image blur correcting device 100 according to the third modification example, by arranging the second coil C2 and the first guide member 13 in the direction X as viewed from the direction Z, the width of the second movable member 30 in the direction Y of can be reduced. As a result, it is possible to realize miniaturization and weight reduction as compared with the image blur correcting device 100 according to the second modification example.

The first guide member 13 is to prevent the first movable member 20 from floating in the direction Z. Therefore, the length of the first guide member 13 can be shorter than the length of the first guide member 12. As a result, as shown in FIG. 9, the second coil C2 and the first guide member 13 can be arranged in the direction X.

Figure 11:
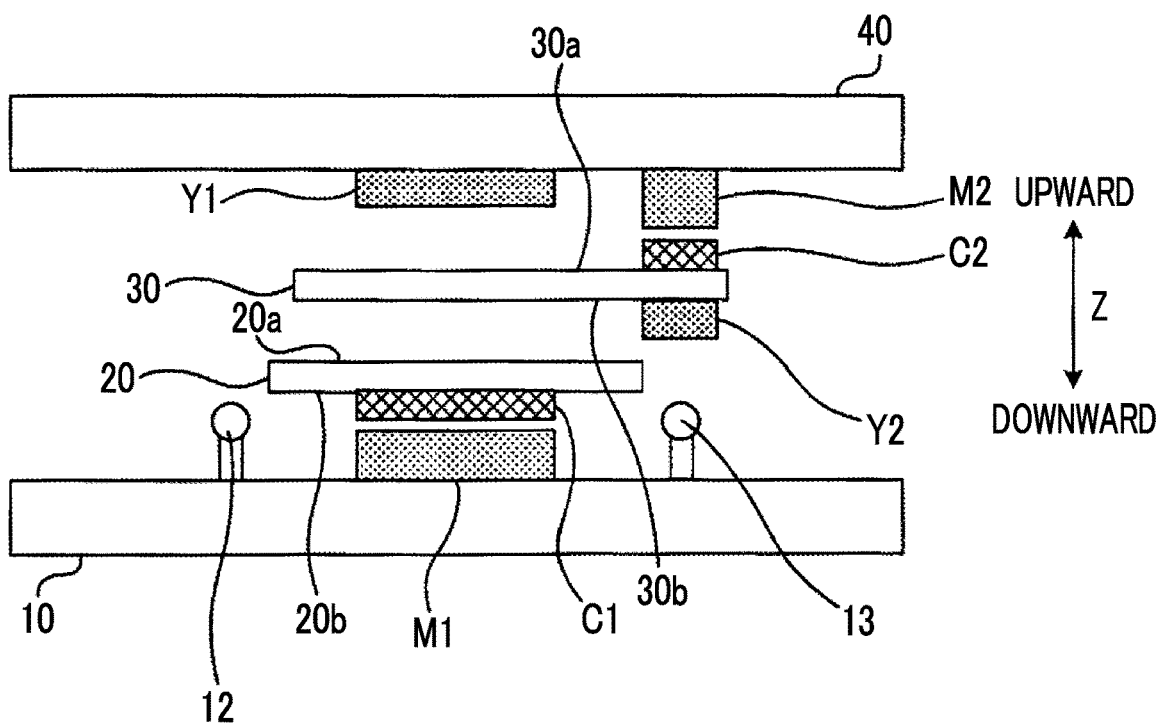
FIG. 11 is a view corresponding to FIG. 4, which shows a fourth modification example of the image blur correcting device 100 of FIG. 1.

Fourth Modification Example of Image Blur Correcting Device According to First Embodiment FIG. 11 is a view corresponding to FIG. 4, which shows a fourth modification example of the image blur correcting device 100 of FIG. 1. In FIG. 11, the same components as those of FIGS. 1 to 4 are designated by the same reference numerals. The image blur correcting device 100 according to the fourth modification example shown in FIG. 11 has the same configuration as those of FIG. 10 except that the second yoke Y2 is fixed to the back surface of the second coil C2 on the second surface 30b of the second movable member 30.

With the image blur correcting device 100 according to the fourth modification example, the distance between the second yoke Y2 and the second magnet M2 can be reduced, and the propulsive force for moving the second movable member 30 can be increased. Alternatively, even in a case in which the thickness of the second coil C2 in the direction Z is reduced, the propulsive force can be sufficiently obtained, and thus it is possible to realize miniaturization and weight reduction of the device.

Figure 12:
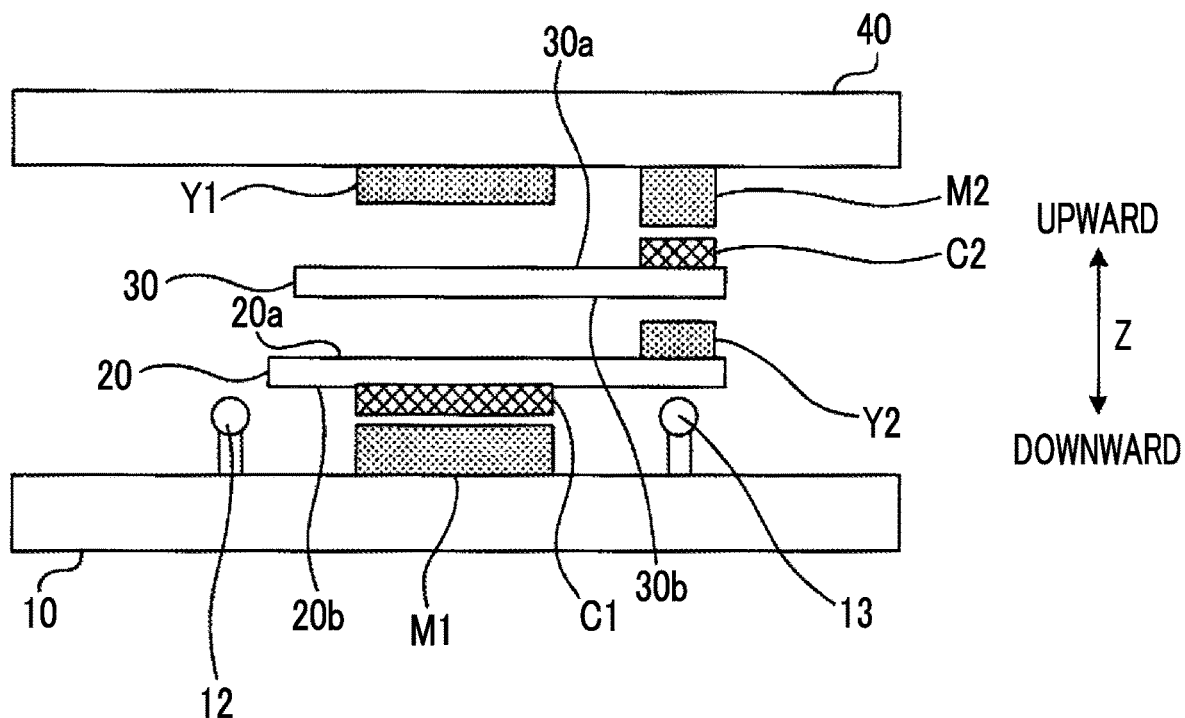
FIG. 12 is a view corresponding to FIG. 4, which shows a fifth modification example of the image blur correcting device 100 of FIG. 1.

Fifth Modification Example of Image Blur Correcting Device According to First Embodiment FIG. 12 is a view corresponding to FIG. 4, which shows a fifth modification example of the image blur correcting device 100 of FIG. 1. In FIG. 12, the same components as those of FIGS. 1 to 4 are designated by the same reference numerals. The image blur correcting device 100 according to the fifth modification example shown in FIG. 12 has the same configuration as those of FIG. 10 except that the second yoke Y2 is fixed to first surface 20a of the first movable member 20 at a position facing the second coil C2.

With the image blur correcting device 100 according to the fifth modification example, the distance between the second yoke Y2 and the second magnet M2 can be reduced, and the propulsive force for moving the second movable member 30 can be increased. Alternatively, even in a case in which the thickness of the second coil C2 in the direction Z is reduced, the propulsive force can be sufficiently obtained, and thus it is possible to realize miniaturization and weight reduction of the device.

Figure 13:
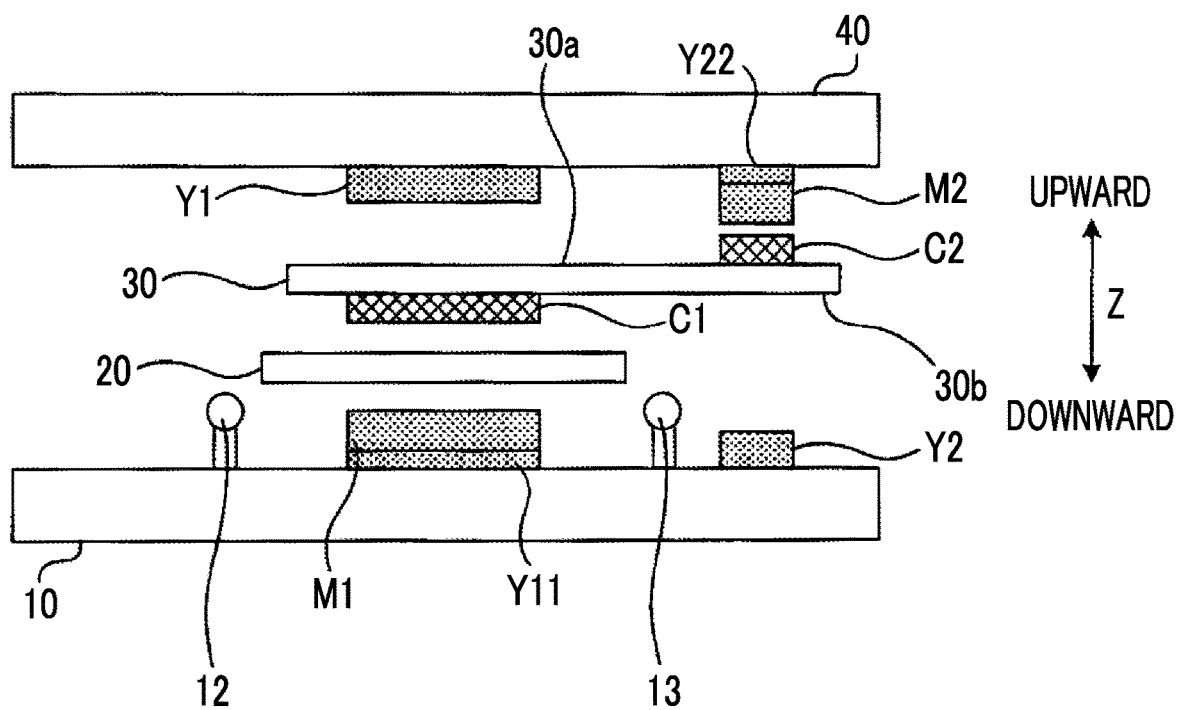
FIG. 13 is a view corresponding to FIG. 4, which shows a sixth modification example of the image blur correcting device 100 of FIG. 1.

Sixth Modification Example of Image Blur Correcting Device According to First Embodiment FIG. 13 is a view corresponding to FIG. 4, which shows a sixth modification example of the image blur correcting device 100 of FIG. 1. In FIG. 13, the same components as those of FIGS. 1 to 4 are designated by the same reference numerals. The image blur correcting device 100 according to the sixth modification example shown in FIG. 13 has the same configuration as those of FIG. 4 except that a second yoke Y22 is added between the second magnet M2 and the facing base 40, and a first yoke Y11 is added between the first magnet M1 and the fixing member 10.

With the image blur correcting device 100 according to the sixth modification example, the propulsive force of the voice coil motors XVCM and YVCM can be further increased. Alternatively, even in a case in which the thicknesses of the first coil C1 and the second coil C2 in the direction Z is reduced, the propulsive force can be sufficiently obtained, and thus it is possible to realize miniaturization and weight reduction of the device.

The configuration in which the first yoke Y11 and the second yoke Y22 are added as in the sixth modification example can be applied to the image blur correcting devices according to the first modification example to the fifth modification example.

Figure 14:
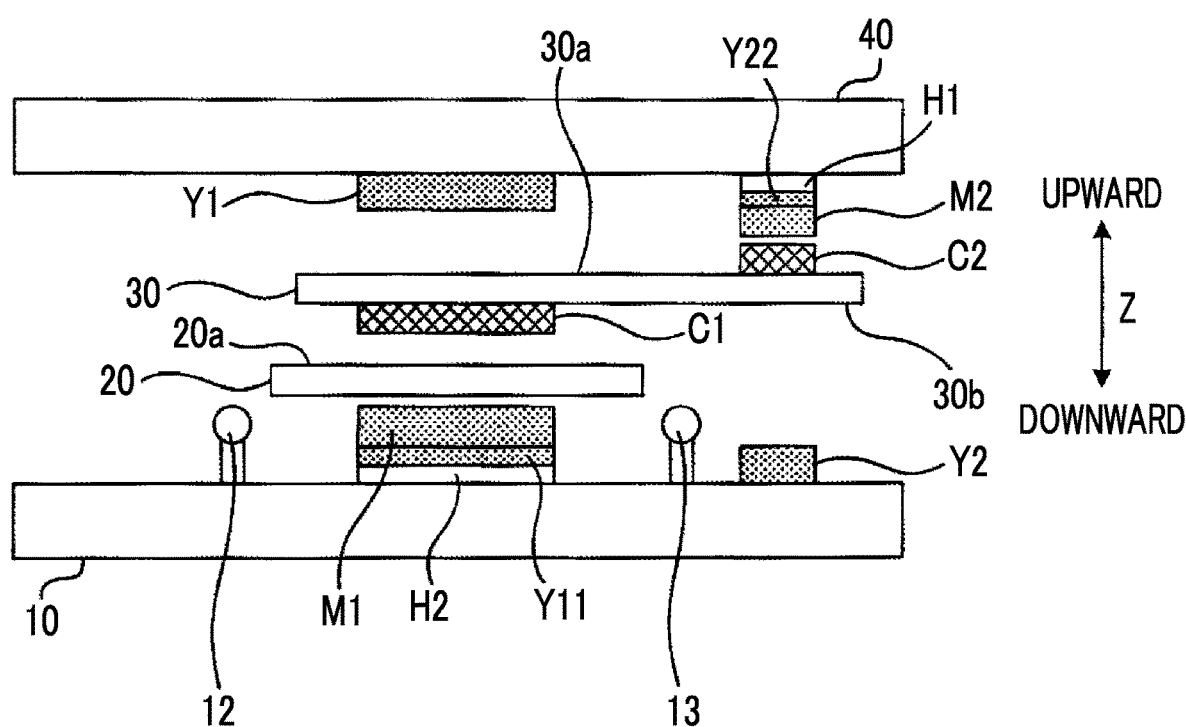
FIG. 14 is a view corresponding to FIG. 4, which shows a seventh modification example of the image blur correcting device 100 of FIG. 1.

Seventh Modification Example of Image Blur Correcting Device According to First Embodiment FIG. 14 is a view corresponding to FIG. 4, which shows a seventh modification example of the image blur correcting device 100 of FIG. 1. In FIG. 14, the same components as those of FIGS. 1 to 4 are designated by the same reference numerals. The image blur correcting device 100 according to the seventh modification example shown in FIG. 14 has the same configuration as those of FIG. 13 except that a height adjusting member H1 is added between the second yoke Y22 and the facing base 40, and a height adjusting member H2 is added between the first yoke Y11 and the fixing member 10.

With the image blur correcting device 100 according to the seventh modification example, the distance between the first magnet M1 and the first coil C1 and the distance between the second magnet M2 and the second coil C2 can be reduced by the height adjusting members H1 and H2. As a result, the propulsive force of the voice coil motors XVCM and YVCM can be further increased. Alternatively, even in a case in which the thicknesses of the first coil C1 and the second coil C2 in the direction Z is reduced, the propulsive force can be sufficiently obtained, and thus it is possible to realize miniaturization and weight reduction of the device. By using a light material, such as resin, as the height adjusting members H1 and H2, it is possible to further realize the weight reduction of the device.

The configuration in which the first yoke Y11, the second yoke Y22, the height adjusting members H1 and H2 are added as in the seventh modification example can be applied to the image blur correcting devices according to the first modification example to the fifth modification example.

In the image blur correcting device 100 described above, a configuration may be adopted in which the positions of the first coil C1 and the first magnet M1 are reversed, and the positions of the second coil C2 and the second magnet M2 are reversed. In this configuration, the first magnet M1 configures the first drive element, and the second magnet M2 configures the second drive element.

Figure 15:
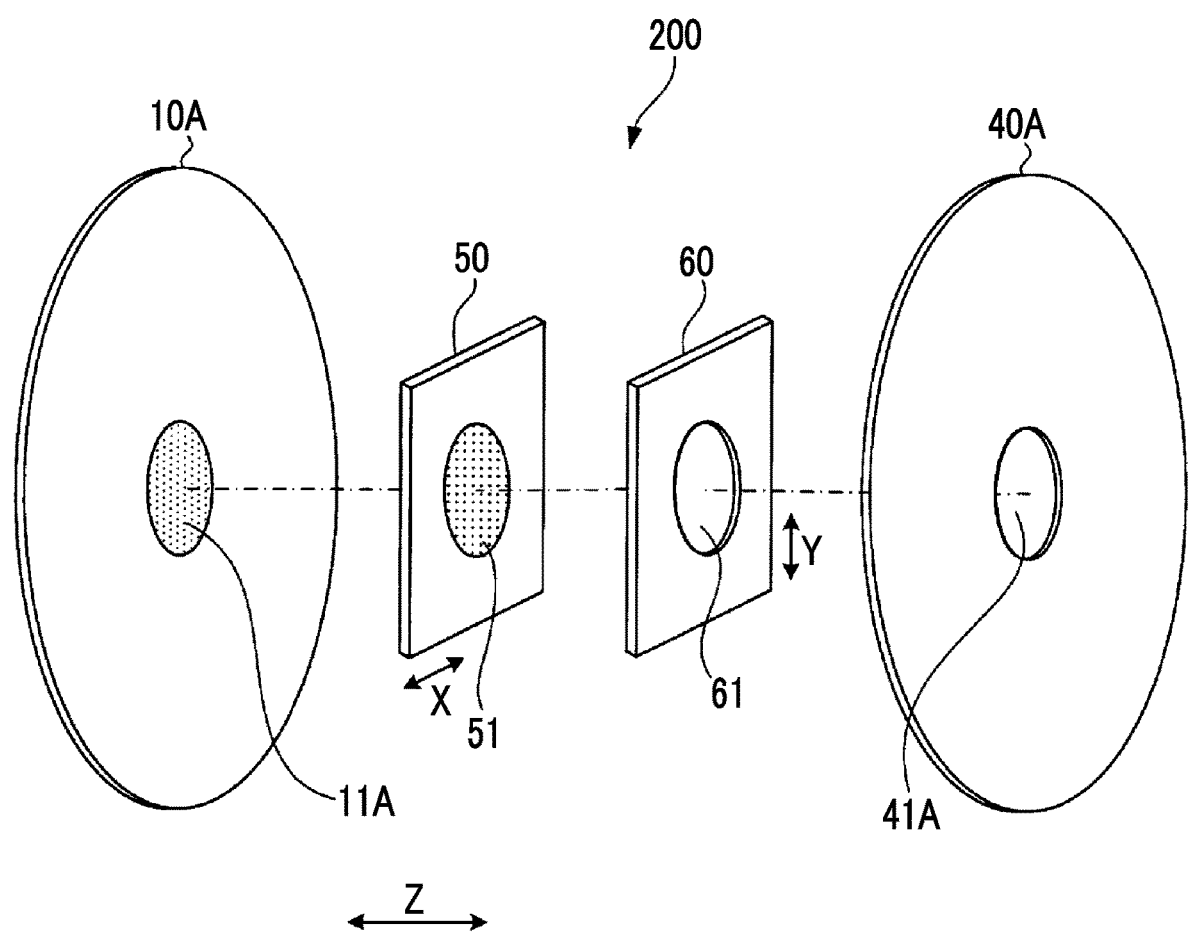
FIG. 15 is an exploded perspective view schematically showing a schematic configuration of an image blur correcting device 200 that is an image blur correcting device according to another embodiment of the present invention.

Overall Configuration of Image Blur Correcting Device According to Second Embodiment FIG. 15 is an exploded perspective view schematically showing a schematic configuration of an image blur correcting device 200 that is an image blur correcting device according to another embodiment of the present invention.

The image blur correcting device 200 is a device that corrects a blur of a captured image captured by an imaging element that images a subject through an imaging optical system including a focus lens and a stop, and is used by being mounted on a lens device including the imaging optical system or an imaging device including the imaging element that images the subject through the lens device including the imaging optical system.

The image blur correcting device 200 comprises a fixing member 10A, a second movable member 50, a first movable member 60, and a facing base 40A. The fixing member 10A, the second movable member 50, the first movable member 60, and the facing base 40A are arranged in this order along a direction Z that is an optical axis direction of the imaging optical system.

In an example of FIG. 15 having an opening on the optical axis of the imaging optical system, the fixing member 10A is an annular plate-shaped member. A lens 11A that is a part of the imaging optical system is fixed to the opening of the fixing member 10A. The lens 11A of the fixing member 10A is not essential component and may be omitted.

The first movable member 60 is supported by the fixing member 10A in a state of being movable in the direction Y perpendicular to the direction Z. In an example of FIG. 15 having an opening 61 on the optical axis of the imaging optical system, the first movable member 60 is a rectangular flat plate-shaped member.

The second movable member 50 is supported by the first movable member 60 in a state of being movable in the direction X perpendicular to the direction Z and the direction Y In an example of FIG. 15 having an opening on the optical axis of the imaging optical system, the second movable member 50 is a rectangular flat plate-shaped member. A correction lens 51 that is a part of the imaging optical system is fixed to the opening of the second movable member 50.

The facing base 40A is a member that faces the fixing member 10A with the first movable member 60 and the second movable member 50 interposed therebetween, and is an annular plate-shaped member in an example of FIG. 15 having an opening 41A on the optical axis of the imaging optical system.

The image blur correcting device 200 is a device that, for example, allows a subject light incident from the opening 41A of the facing base 40A to pass the opening 61, the correction lens 51, and the lens 11 in this order and guides the light to the imaging element (not shown). The image blur correcting device 200 may be a device that, for example, allows a subject light incident on the lens 11A of the fixing member 10A to pass the correction lens 51, the opening 61, and the opening 41A in this order and guides the light to the imaging element (not shown).

In the image blur correcting device 200, the direction X configures a second direction, the direction Y configures a first direction, the direction Z configures a third direction, the second movable member 50 configures a near movable member, the first movable member 60 configures a distant movable member, and the facing base 40A configures a facing fixing member.

Figure 16:
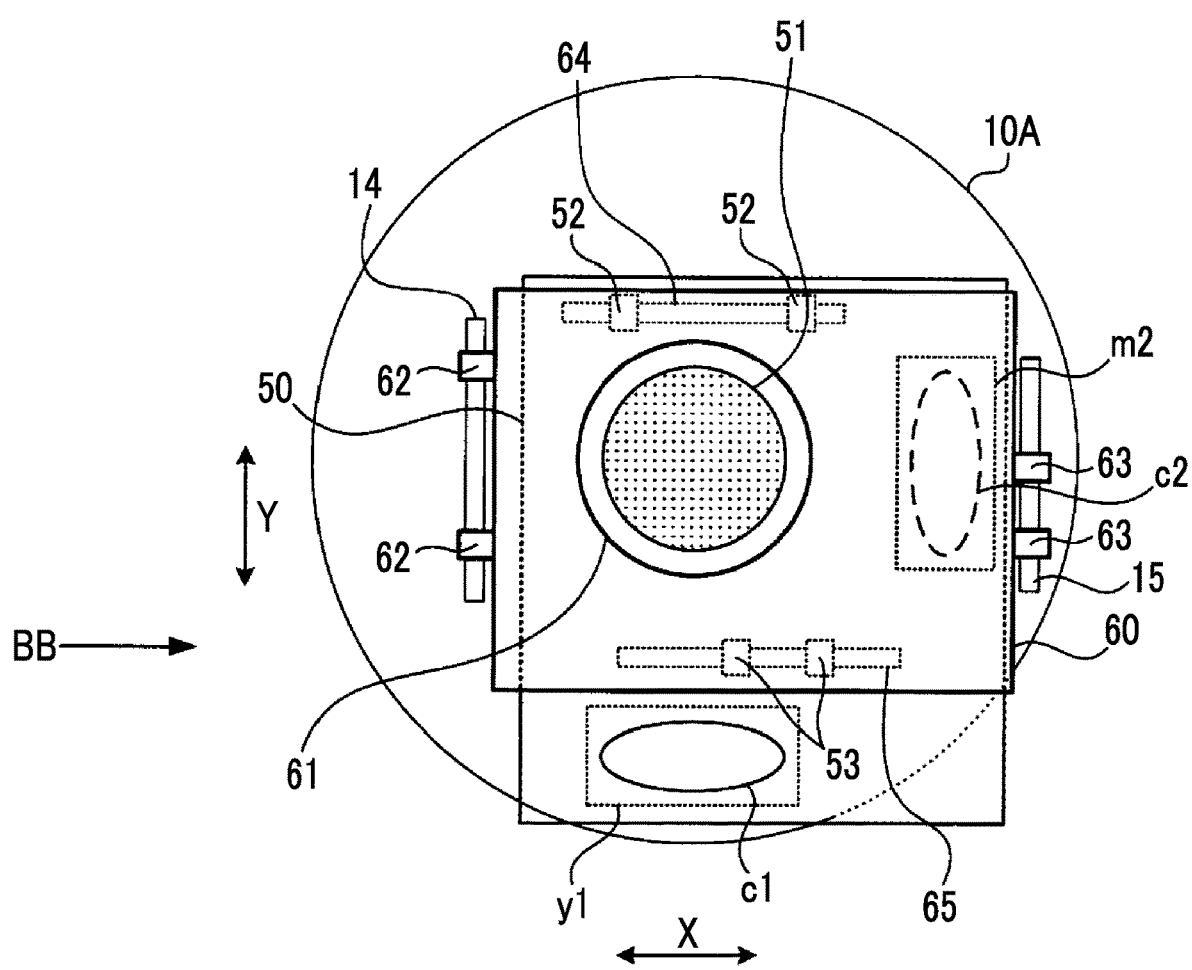
FIG. 16 is a schematic plan view of the image blur correcting device 200 of FIG. 15 as viewed in a direction Z from a facing base 40A side.

Detailed Configuration of Fixing Member, First Movable Member, Second Movable Member, and Facing Base in Image Blur Correcting Device According to Second Embodiment FIG. 16 is a schematic plan view of the image blur correcting device 200 of FIG. 15 as viewed in the direction Z from the facing base 40A side. The facing base 40A is not shown in FIG. 16.

Figure 17:
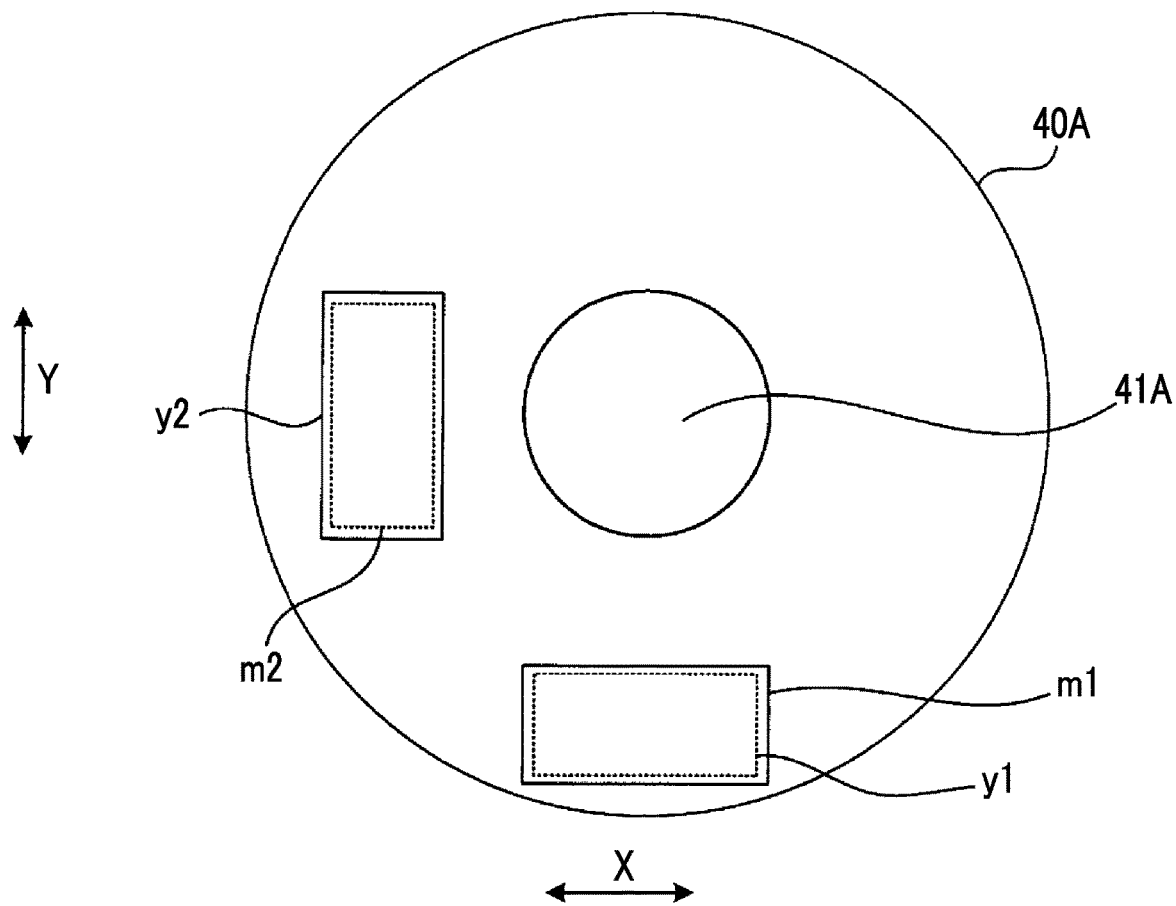
FIG. 17 is a schematic plan view of a facing base 40A in the image blur correcting device 200 of FIG. 15 as viewed in the direction Z from a first movable member 60 side.

FIG. 17 is a schematic plan view of the facing base 40A in the image blur correcting device 200 of FIG. 15 as viewed in the direction Z from the first movable member 60 side. In FIG. 17, the positions of the components (second magnet m2 and first yoke y1 described below) provided in the fixing member 10A are shown by broken lines.

Figure 18:
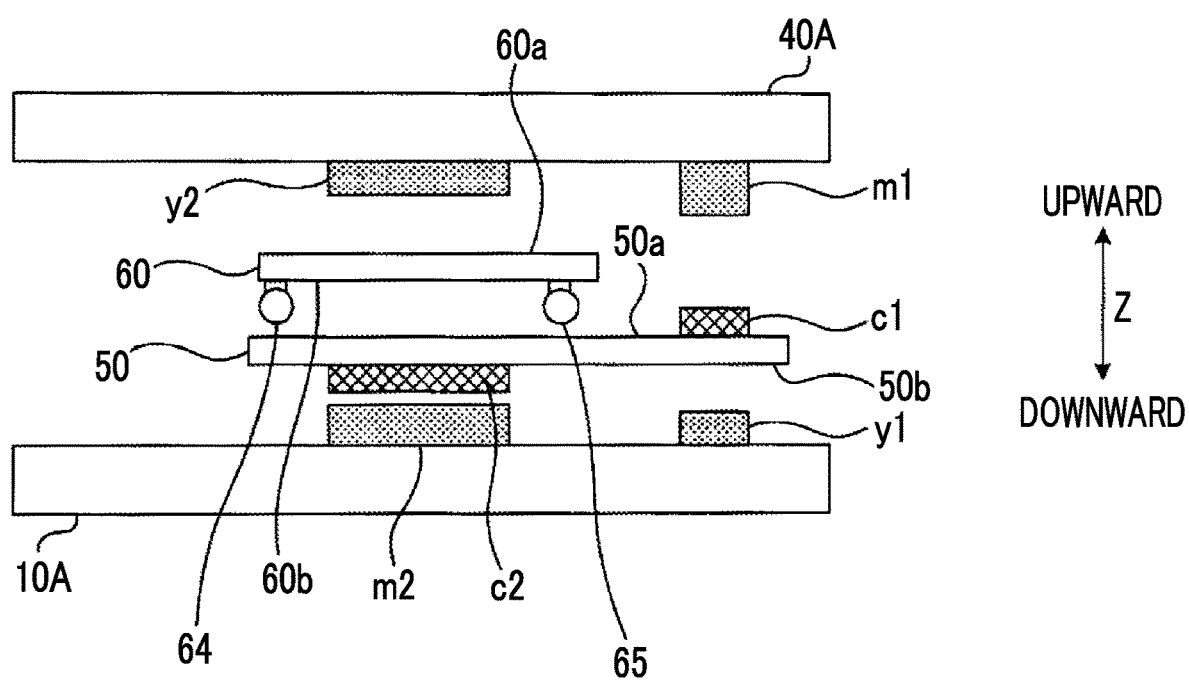
FIG. 18 is a schematic side view of the image blur correcting device 200 shown in FIG. 16 as viewed from a direction BB that is one of a direction X.

FIG. 18 is a schematic side view of the image blur correcting device 200 shown in FIG. 16 as viewed from a direction BB that is one of the direction X. In FIG. 18, among the components shown in FIG. 16, bearings 52 and 62, first guide members 14 and 15, and engagement portions 53 and 63, which will be described below, are not shown.

In the following, a direction from the back side to the front side of the paper surface in FIG. 16 (the direction from the fixing member 10A to the facing base 40A in FIG. 18) is referred to as an upward direction, and an opposite direction of the upward direction is referred to as a downward direction.

As shown in FIGS. 16 and 18, first guide members 14 and 15 that guide the movement of the first movable member 60 in the direction Y are fixed to the fixing member 10A.

Each of the first guide members 14 and 15 is, for example, a columnar member that extends in the direction Y, and is fixed to an upper surface of the fixing member 10A in a state of being separated from the upper surface. In the example of FIG. 16, the first guide members 14 and 15 are disposed separated from each other in the direction X with the lens 11A (not shown in FIG. 16) of the fixing member 10A interposed therebetween.

As shown in FIG. 16, in the first movable member 60, two tubular bearings 62 into which the first guide member 14 is inserted and two engagement portions 63 for floating prevention, which engage with the first guide member 15 are provided. The first movable member 60 is configured to move in the direction Y by the two bearings 62 sliding with respect to the first guide member 14.

As shown in FIGS. 16 and 18, second guide members 64 and 65 that guide the movement of the second movable member 50 in the direction X are fixed to a second surface 60$b$ on the lower side of the first movable member 60.

Each of the second guide members 64 and 65 is, for example, a columnar member that extends in the direction X, and is fixed to the second surface 60$b$ of the first movable member 60 in a state of being separated from the second surface 60$b$. In the example of FIG. 16, the second guide members 64 and 65 are disposed separated from each other in the direction Y with the opening 61 of the first movable member 60 interposed therebetween.

As shown in FIG. 16, in the second movable member 50, two tubular bearings 52 into which the second guide member 64 is inserted and two engagement portions 53 for floating prevention, which engage with the second guide member 65 are provided. The second movable member 50 is configured to move in the direction X by the two bearings 52 sliding with respect to the second guide member 64.

As shown in FIGS. 16 and 18, a second coil c2 that generates a propulsive force for moving the second movable member 50 in the direction X is formed on a second surface 50$b$ on the lower side of the second movable member 50.

The second coil c2 is disposed between the first guide member 15 and the correction lens 51. The upper end portion of the second coil c2 and the second surface 50$b$ of the second movable member 50 have the same position in the direction Z. That is, the second coil c2 protrudes from the second surface 50$b$ in the downward direction.

As shown in FIGS. 16 and 18, a first coil c1 that generates a propulsive force for moving the first movable member 60 in the direction Y is formed on a first surface 50$a$ on the upper side of the second movable member 50.

The first coil c1 is disposed at a position on an opposite side to the opening 61 side with respect to the second guide member 65. The lower end portion of the first coil c1 and the first surface 50$a$ of the second movable member 50 have the same position in the direction Z. That is, the first coil c1 protrudes from the first surface 50$a$ in the upward direction.

The position of the upper end portion of the second coil c2 in the direction Z need only be lower than the position of the first surface 50$a$ in the direction Z. Further, the position of the lower end portion of the first coil c1 in the direction Z need only be higher than the position of the second surface 50$b$ in the direction Z. For example, as shown in FIG. 5, the first coil c1 and the second coil c2 may each have a configuration in which a part thereof is embedded in the second movable member 50.

As described above, by configuring the first coil c1 and the second coil c2 to have a portion that protrudes from the second movable member 50, it is possible to increase the propulsive force for moving the first movable member 60 in the direction Y and the propulsive force for moving the second movable member 50 in the direction X while realizing reduction of the thickness of the second movable member 50 in the direction Z and weight reduction.

As shown in FIGS. 16 to 18, a second magnet m2 that generates a propulsive force for moving the second movable member 50 in the direction X is provided on the upper surface of the fixing member 10A at a position facing the second coil c2. Further, a second yoke y2 that suppresses a magnetic flux leakage of the second magnet m2 is provided on a lower surface of the facing base 40A at a position overlapping the second magnet m2.

As shown in FIGS. 16 to 18, a first magnet m1 that generates a propulsive force for moving the first movable member 60 in the direction Y is provided on the lower surface of the facing base 40A at a position facing the first coil c1. Further, a first yoke y1 that suppresses a magnetic flux leakage of the first magnet m1 is provided on the upper surface of the fixing member 10A at a position overlapping the first magnet m1.

A voice coil motor YVCM that drives the first movable member 60 is configured by the first coil c1, the first magnet m1, and the first yoke y1, and a voice coil motor XVCM that drives the second movable member 50 is configured by the second coil c2, the second magnet m2, and the second yoke y2.

In a case in which a current flows through the second coil c2, the second movable member 50 moves in the direction X while sliding with respect to the second guide members 64 and 65. In a case in which a current flows through the first coil c1, the first movable member 60 connected to the second movable member 50 via the second guide members 64 and 65 moves in the direction Y while sliding with respect to the first guide members 14 and 15. As described above, by energizing the first coil c1 and the second coil c2, the correction lens 51 moves in the direction X and the direction Y, the image blur is corrected.

In the image blur correcting device 200, the first coil c1 configures the first drive element, and the second coil c2 configures the second drive element.

Effect of Image Blur Correcting Device According to Second Embodiment

In the image blur correcting device 200 configured as described above, the second coil c2 is disposed on the lower side than the first surface 50a of the second movable member 50, and the first coil c1 is disposed on the upper side than the second surface 50b of the second movable member 50.

With this configuration, for example, it is not necessary to avoid interference between the second coil c2 and the second guide members 64 and 65, and thus the degree of freedom in design can be improved. Therefore, it is possible to realize miniaturization and weight reduction.

Further, for example, in FIG. 18, the first yoke y1 can be disposed on the back surface of the first coil c1 on the second surface 50b of the second movable member 50, and even in a case in which the thickness of the first coil c1 in the direction Z can be slightly reduced, it is possible to obtain a sufficient propulsive force and to realize weight reduction of the device.

Further, the image blur correcting device 200 can have a configuration in which the second coil c2 is formed on the first surface 50a, the second yoke y2 is changed to the second magnet m2, the first coil c1 is formed in the second surface 50b, and the first yoke y1 is changed to the first magnet m1, in FIG. 18. With this configuration, it is not necessary to avoid interference between the first coil c1 and the second guide member 65, and thus the degree of freedom in design can be improved. Therefore, it is possible to realize miniaturization and weight reduction.

Figure 19:
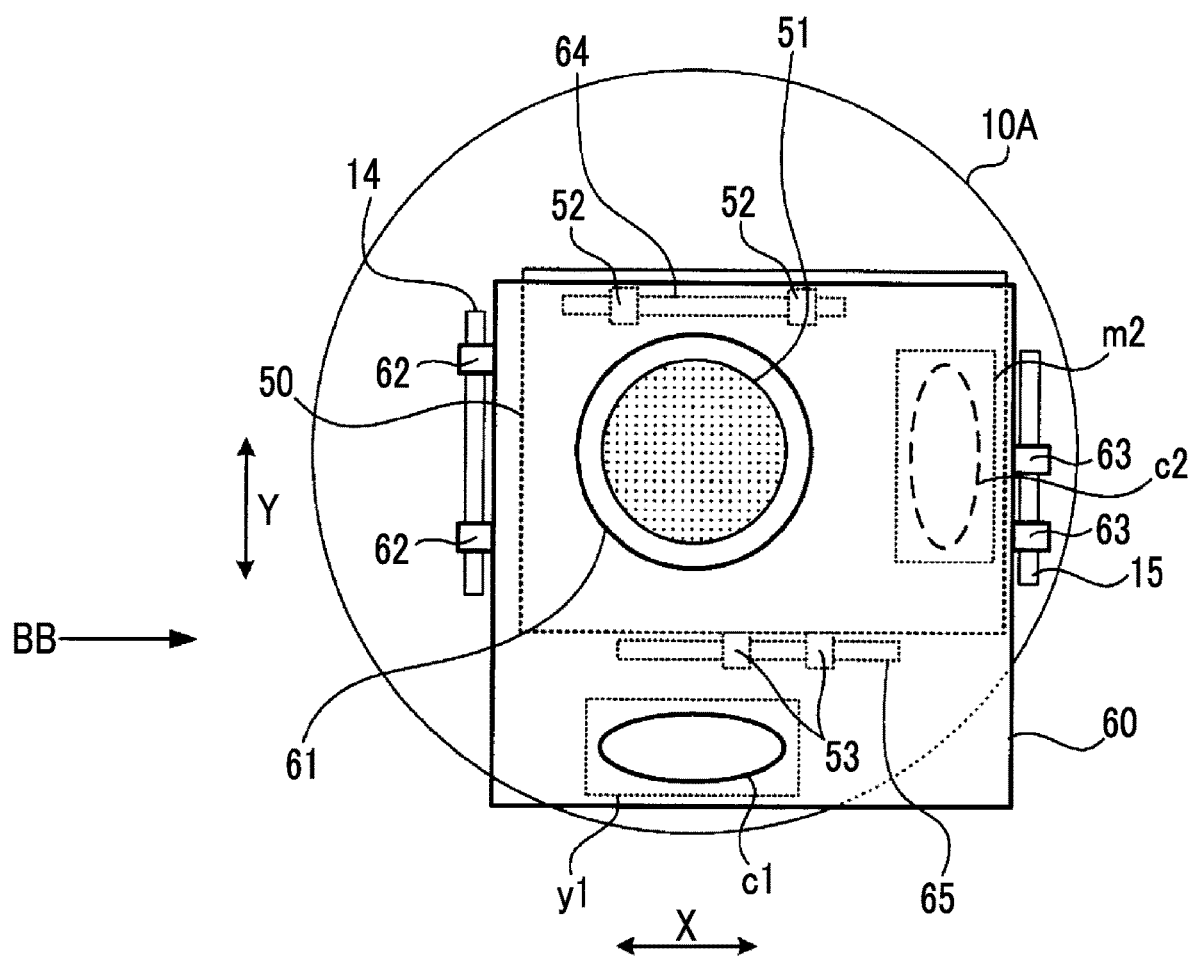
FIG. 19 is a view corresponding to FIG. 16, which shows a first modification example of the image blur correcting device 200 of FIG. 15.
Figure 20:
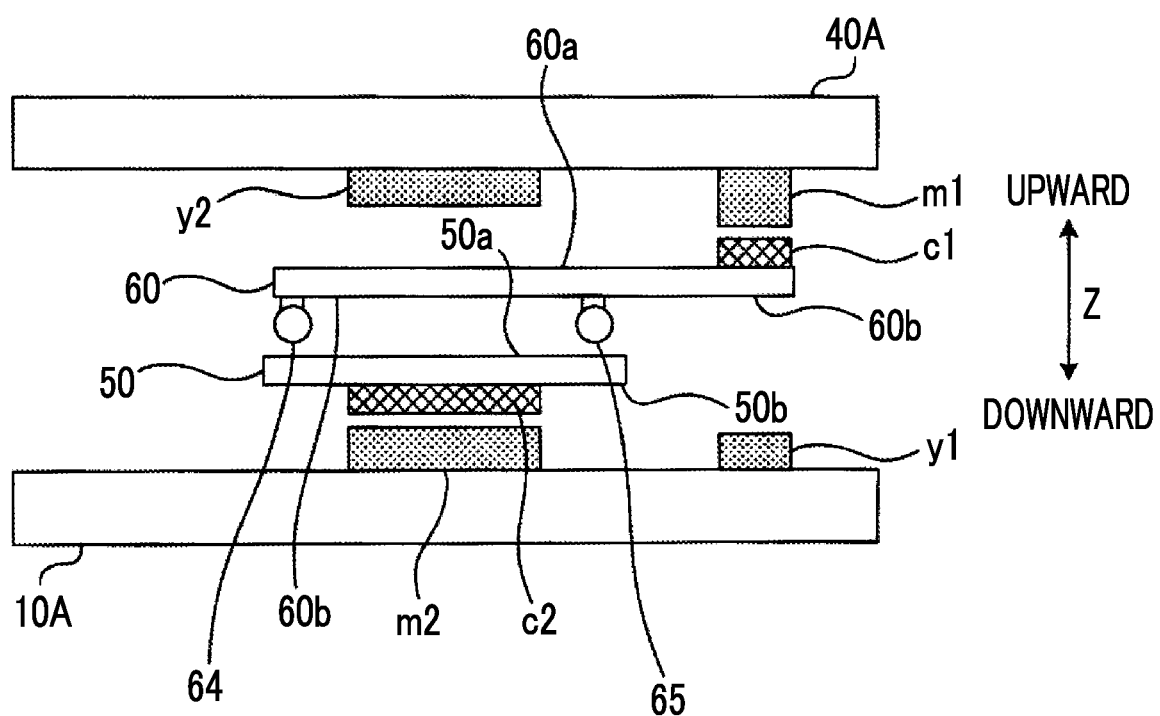
FIG. 20 is a schematic side view of the image blur correcting device 200 shown in FIG. 19 as viewed from the direction BB that is one of the direction X.

First Modification Example of Image Blur Correcting Device According to Second Embodiment FIG. 19 is a view corresponding to FIG. 16, which shows a first modification example of the image blur correcting device 200 of FIG. 15. FIG. 20 is a schematic side view of the image blur correcting device 200 shown in FIG. 19 as viewed from the direction BB that is one of the direction X. In FIGS. 19 and 20, the same components as those of FIGS. 15 to 18 are designated by the same reference numerals.

The image blur correcting device 200 according to the first modification example shown in FIGS. 19 and 20 has the same configuration as those of FIGS. 16 and 18 except that the width of the first movable member 60 in the direction Y is increased, the disposition place of the first coil c1 is changed to the first surface 60a on the upper side of the first movable member 60, and the width of the second movable member 50 in the direction Y is reduced.

The image blur correcting device 200 shown in FIGS. 19 and 20 may have a configuration in which a part of the first coil c1 is embedded in the first movable member 60, and a part of the second coil c2 is embedded in the second movable member 50.

With the image blur correcting device 200 according to the first modification example, the first coil c1 is provided on the first surface 60a of the first movable member 60, and thus the space for the first coil c1 in the second movable member 50 is not necessary, and it is possible to realize miniaturization and weight reduction of the second movable member 50.

Since the heavy correction lens 51 is mounted on the second movable member 50, it is possible to realize weight reduction of the second movable member 50, and thus it is possible to obtain a sufficient propulsive force even in a case in which the thickness of the second coil c2 is reduced.

Further, by providing the first coil c1 on the first surface 60a of the first movable member 60, it is not necessary to avoid interference between the second guide member 65 and the first coil c1, and thus the degree of freedom in design can be improved. Therefore, it is possible to realize miniaturization and weight reduction of the device.

Figure 21:
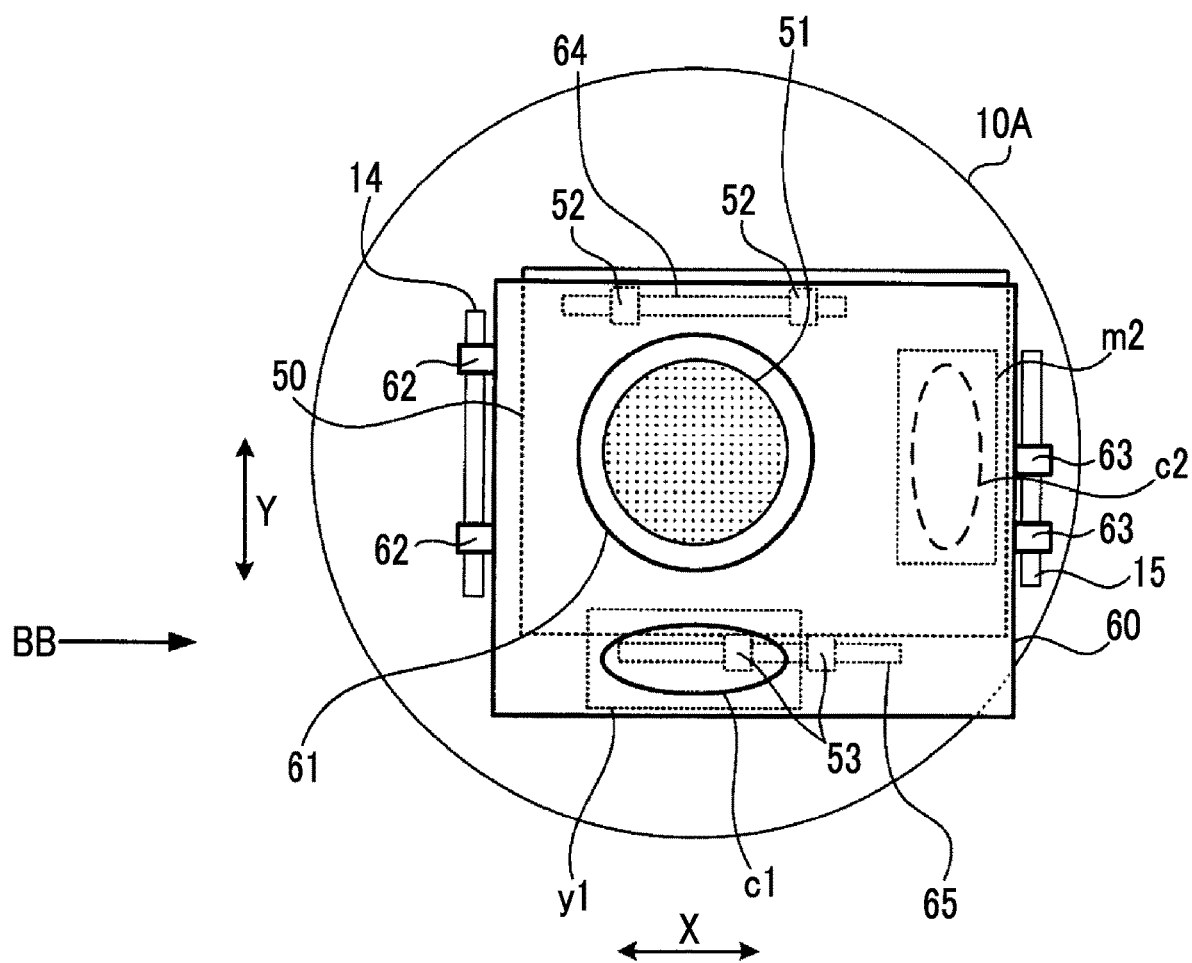
FIG. 21 is a view corresponding to FIG. 16, which shows a second modification example of the image blur correcting device 200 of FIG. 15.
Figure 22:
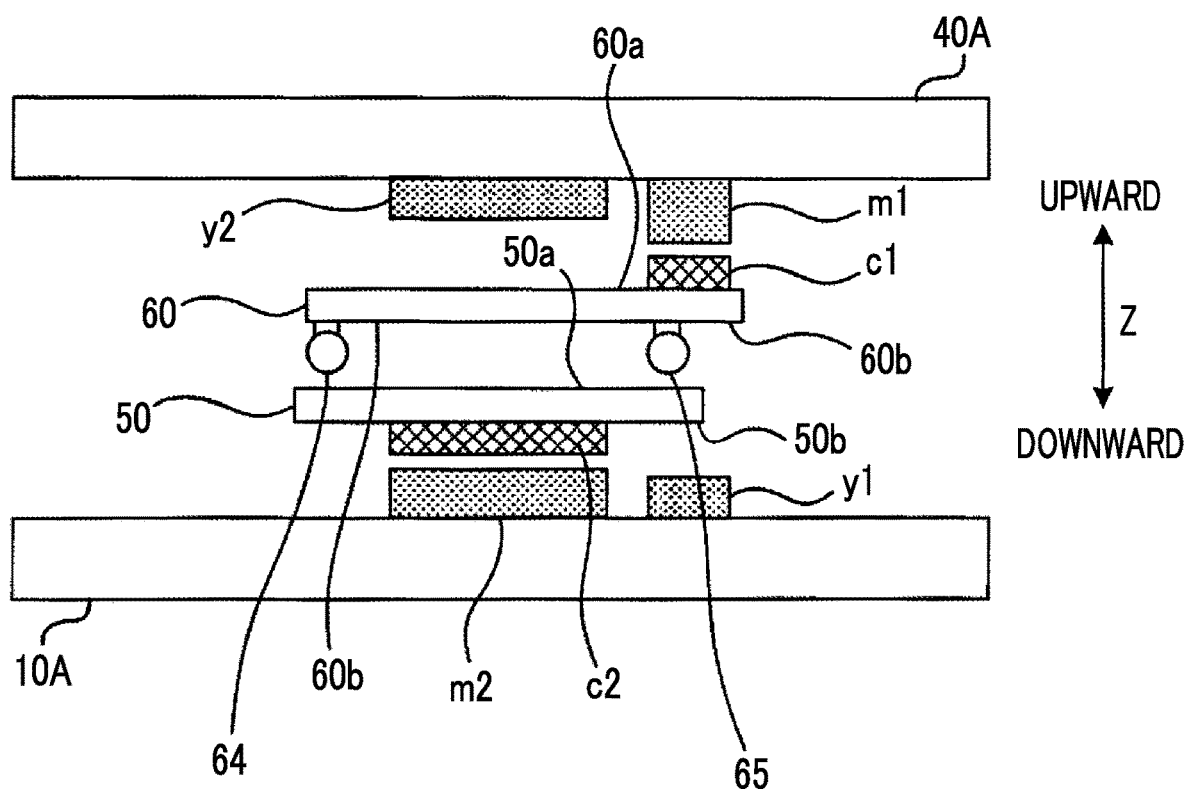
FIG. 22 is a schematic side view of the image blur correcting device 200 shown in FIG. 21 as viewed from the direction BB that is one of the direction X.

Second Modification Example of Image Blur Correcting Device According to Second Embodiment FIG. 21 is a view corresponding to FIG. 16, which shows a second modification example of the image blur correcting device 200 of FIG. 15. FIG. 22 is a schematic side view of the image blur correcting device 200 shown in FIG. 21 as viewed from the direction BB that is one of the direction X. In FIGS. 21 and 22, the same components as those of FIGS. 15 to 18 are designated by the same reference numerals.

The image blur correcting device 200 according to the second modification example shown in FIGS. 21 and 22 has the same configuration as those of FIG. 19 except that the positions of the first magnet m1, the first yoke y1, and the first coil c1 are changed to the positions overlapping the second guide member 65 as viewed in the direction Z, and the width of the first movable member 60 in the direction Y is reduced.

With the image blur correcting device 200 according to the second modification example, the first coil c1 is formed at a position overlapping the second guide member 65, and thus the width of the first movable member 60 in the direction Y can be reduced, and it is possible to realize miniaturization and the weight reduction as compared with the image blur correcting device 200 according to the first modification example.

Figure 23:
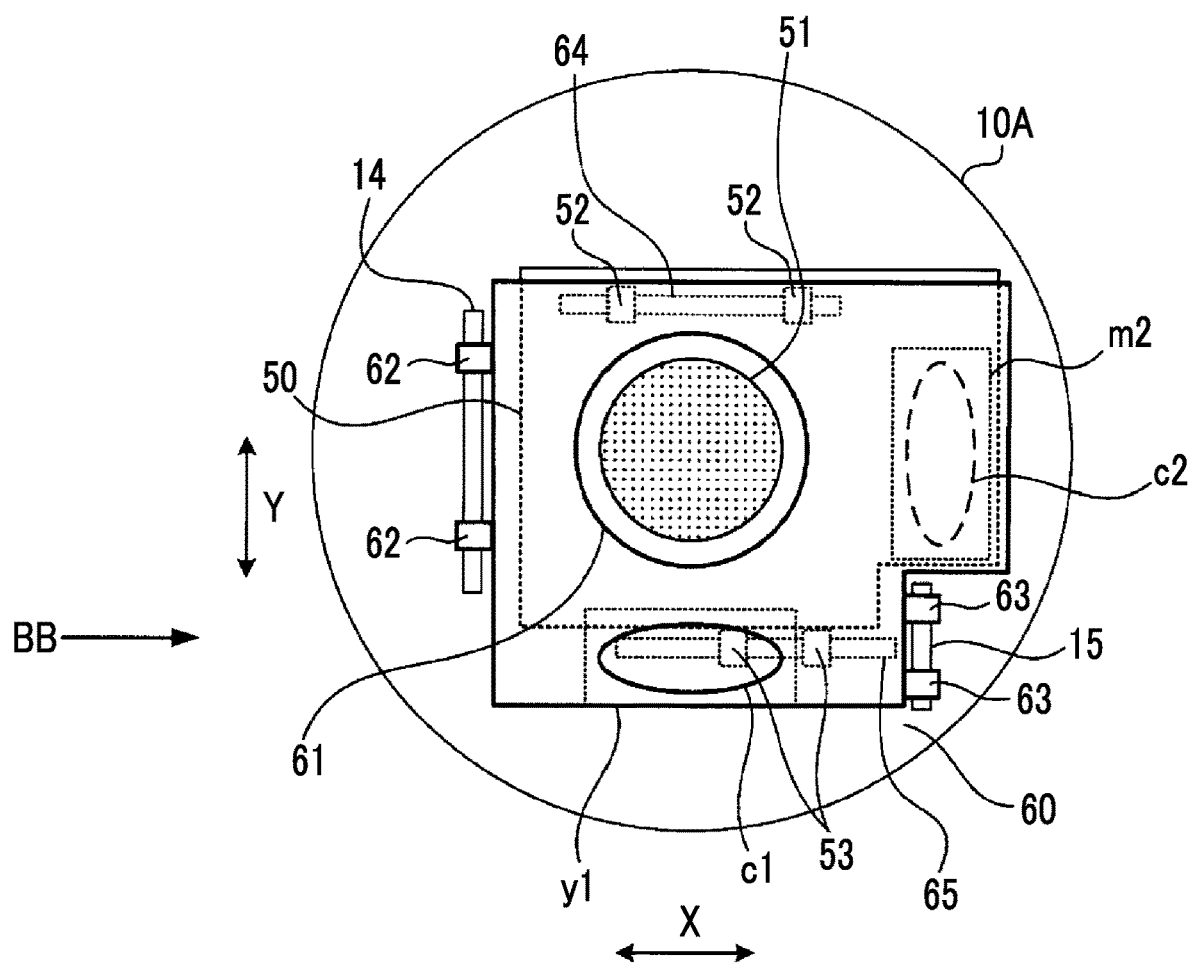
FIG. 23 is a view corresponding to FIG. 16, which shows a third modification example of the image blur correcting device 200 of FIG. 15.

Third Modification Example of Image Blur Correcting Device According to Second Embodiment FIG. 23 is a view corresponding to FIG. 16, which shows a third modification example of the image blur correcting device 200 of FIG. 15. In FIG. 23, the same components as those of FIGS. 15 to 18 are designated by the same reference numerals.

The image blur correcting device 200 according to the third modification example shown in FIG. 23 has the same configuration as those of FIG. 21 except that the first guide member 15 is moved to the position next to the second coil c2, the second magnet m2, and the second yoke y2 in the direction Y, and the shapes of the first movable member 60 and the second movable member 50 are partially changed.

With the image blur correcting device 200 according to the third modification example, by arranging the second coil c2 and the first guide member 15 in the direction Y as viewed from the direction Z, the sizes of the first movable member 60 and the second movable member 50 can be reduced. As a result, it is possible to realize miniaturization and weight reduction as compared with the image blur correcting device 200 according to the second modification example.

The first guide member 15 is to prevent the first movable member 60 from floating in the direction Z. Therefore, the length of the first guide member 15 can be shorter than the length of the first guide member 14. As a result, as shown in FIG. 23, the second coil c2 and the first guide member 15 can be arranged in the direction Y.

Figure 24:
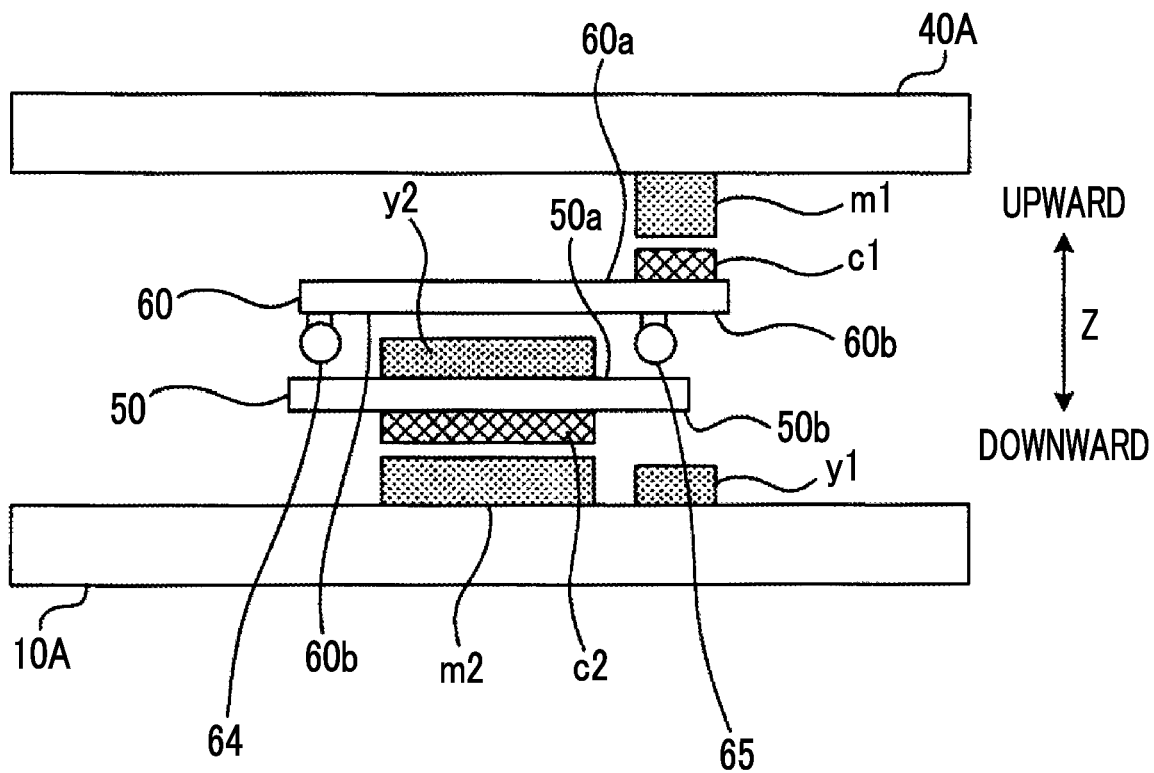
FIG. 24 is a view corresponding to FIG. 18, which shows a fourth modification example of the image blur correcting device 200 of FIG. 15.

Fourth Modification Example of Image Blur Correcting Device According to Second Embodiment FIG. 24 is a view corresponding to FIG. 18, which shows a fourth modification example of the image blur correcting device 200 of FIG. 15. In FIG. 24, the same components as those of FIGS. 15 to 18 are designated by the same reference numerals. The image blur correcting device 200 according to the fourth modification example shown in FIG. 24 has the same configuration as those of FIG. 22 except that the second yoke y2 is fixed to the back surface of the second coil c2 on the first surface 50a on the upper side of the second movable member 50.

With the image blur correcting device 200 according to the fourth modification example, the distance between the second yoke y2 and the second magnet m2 can be reduced, and the propulsive force for moving the second movable member 50 can be increased.

Alternatively, even in a case in which the thickness of the second coil c2 in the direction Z is reduced, the propulsive force can be sufficiently obtained, and thus it is possible to realize miniaturization and weight reduction of the device.

Figure 25:
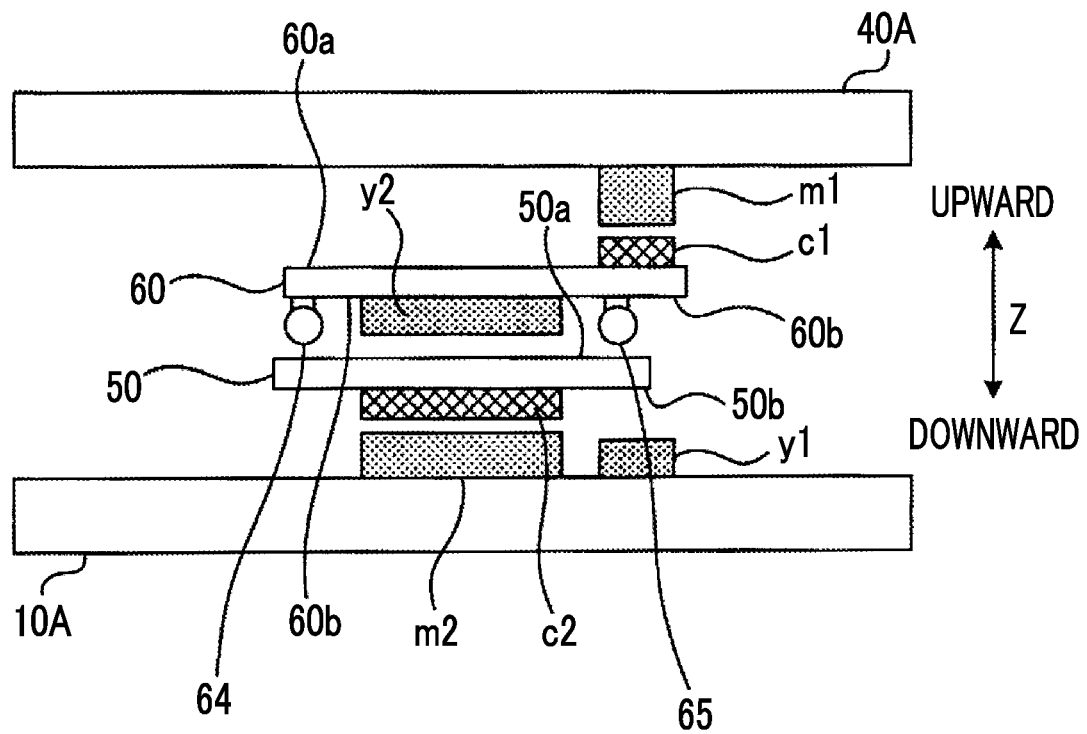
FIG. 25 is a view corresponding to FIG. 18, which shows a fifth modification example of the image blur correcting device 200 of FIG. 15.

Fifth Modification Example of Image Blur Correcting Device According to Second Embodiment FIG. 25 is a view corresponding to FIG. 18, which shows a fifth modification example of the image blur correcting device 200 of FIG. 15. In FIG. 25, the same components as those of FIGS. 15 to 18 are designated by the same reference numerals. The image blur correcting device 200 according to the fifth modification example shown in FIG. 25 has the same configuration as those of FIG. 22 except that the second yoke y2 is fixed to second surface 60b on the lower side of the first movable member 60 at a position facing the second coil c2.

With the image blur correcting device 200 according to the fifth modification example, the distance between the second yoke y2 and the second magnet m2 can be reduced, and the propulsive force for moving the second movable member 50 can be increased. Alternatively, even in a case in which the thickness of the second coil c2 in the direction Z is reduced, the propulsive force can be sufficiently obtained, and thus it is possible to realize miniaturization and weight reduction of the device.

The configurations shown in FIGS. 13 and 14 can be applied to both the image blur correcting device 200 according to the second embodiment and the image blur correcting device 200 according to the first modification example to the fifth modification example. That is, the yoke can be added to the first magnet m1 and the facing base 40A, the height adjusting member can be added between the yoke and the facing base 40A, the yoke can be added between the second magnet m2 and the fixing member 10A, or the height adjusting member can be added between the yoke and the fixing member 10A.

In the image blur correcting device 200 described above, a configuration may be adopted in which the positions of the first coil c1 and the first magnet m1 are reversed, and the positions of the second coil c2 and the second magnet m2 are reversed. In this configuration, the first magnet m1 configures the first drive element, and the second magnet m2 configures the second drive element.

Further, the image blur correcting device 100 and the image blur correcting device 200 correct the image blur by moving the correction lens, but by changing each of the correction lens 31 and the correction lens 51, which are described above, to the imaging element, the image blur correcting device that corrects the image blur by moving the imaging element can be realized.

As described above, the following matters are disclosed in the present specification.

(1) An image blur correcting device that corrects a blur of a captured image captured by an imaging element that images a subject through an imaging optical system, the device comprising a fixing member, a first movable member that is supported by the fixing member in a state of being movable in a first direction, a second movable member that is supported by the first movable member in a state of being movable in a second direction intersecting the first direction, a correction lens that is included in the imaging element fixed to the second movable member or the imaging optical system fixed to the second movable member, a first coil and a first magnet that generate a propulsive force for moving the first movable member in the first direction, and a second coil and a second magnet that generate a propulsive force for moving the second movable member in the second direction, in which, of the first movable member and the second movable member, a movable member that is relatively far from the fixing member in a third direction perpendicular to the first direction and the second direction is defined as a distant movable member, and a movable member that is relatively close to the fixing member is defined as a near movable member, the first coil or the first magnet is defined as a first drive element, and the second coil or the second magnet is defined as a second drive element, in the third direction, a surface of the distant movable member or the near movable member on an opposite side to a fixing member side is defined as a first surface of the distant movable member or the near movable member, in the third direction, a surface of the distant movable member or the near movable member on the fixing member side is defined as a second surface of the distant movable member or the near movable member, one of the first drive element and the second drive element is provided on the distant movable member or the near movable member to be closer to the fixing member side than the first surface, and the other of the first drive element and the second drive element is provided on the distant movable member or the near movable member to be closer to the opposite side to the fixing member side than the second surface.

(2) The image blur correcting device according to (1), in which the first drive element and the second drive element are each fixed to the distant movable member or the near movable member.

(3) The image blur correcting device according to (2), in which the one of the first drive element and the second drive element has a portion that protrudes from the second surface of the distant movable member or the near movable member.

(4) The image blur correcting device according to (2) or (3), in which the other of the first drive element and the second drive element has a portion that protrudes from the first surface of the distant movable member or the near movable member.

(5) The image blur correcting device according to any one of (2) to (4), further comprising a facing fixing member that faces the fixing member with the distant movable member and the near movable member interposed therebetween, in which the first coil and the second coil are fixed to the distant movable member or the near movable member, the first magnet is fixed to the fixing member or the facing fixing member at a position facing the first coil, and the second magnet is fixed to the facing fixing member or the fixing member at a position facing the second coil.

(6) The image blur correcting device according to (1), in which one of the first drive element and the second drive element is fixed to the near movable member, and is provided on the near movable member to be closer to the fixing member side than the first surface, and the other of the first drive element and the second drive element is fixed to the distant movable member, and is provided on the distant movable member to be closer to the opposite side to the fixing member side than the second surface.

(7) The image blur correcting device according to (6), in which the one of the first drive element and the second drive element has a portion that protrudes from the second surface of the near movable member.

(8) The image blur correcting device according to (6) or (7), in which the other of the first drive element and the second drive element has a portion that protrudes from the first surface of the distant movable member.

(9) The image blur correcting device according to any one of (6) to (8), in which a guide member that guides movement of the distant movable member or the near movable member is fixed to the first surface of the near movable member or the second surface of the distant movable member, and a part of the guide member and the first drive element overlap each other as viewed in the third direction.

(10) The image blur correcting device according to any one of (6) to (9), in which two first guide members that guide movement of the first movable member in the first direction and extend in the first direction are fixed to the fixing member, and one of the two first guide members and the second drive element are arranged in the first direction as viewed in the third direction.

(11) The image blur correcting device according to (10), in which the first coil is fixed to the near movable member, the second coil is fixed to the distant movable member, the first magnet is fixed to the fixing member at a position facing the first coil, and the second magnet is fixed at a position facing the second coil on an opposite side to a near movable member side.

(12) The image blur correcting device according to (11), in which a yoke that prevents a magnetic flux leakage of the second magnet is fixed to a back surface of the second coil of the distant movable member, or the first surface of the near movable member at a position facing the second coil.

(13) The image blur correcting device according to (10), in which the second coil is fixed to the near movable member, the first coil is fixed to the distant movable member, the second magnet is fixed to the fixing member at a position facing the second coil, and the first magnet is fixed at a position facing the first coil on an opposite side to a near movable member side.

(14) The image blur correcting device according to (13), in which a yoke that prevents a magnetic flux leakage of the second magnet is fixed to a back surface of the second coil of the near movable member, or the second surface of the distant movable member at a position facing the second coil.

(15) An image blur correcting device that corrects a blur of a captured image captured by an imaging element that images a subject through an imaging optical system, the device comprising a fixing member, a first movable member that is supported by the fixing member in a state of being movable in a first direction, a second movable member that is supported by the first movable member in a state of being movable in a second direction intersecting the first direction and is disposed to be closer to an opposite side to a fixing member side than the first movable member in a third direction perpendicular to the first direction and the second direction, a correction lens that is included in the imaging element fixed to the second movable member or the imaging optical system fixed to the second movable member, a first coil and a first magnet that generate a propulsive force for moving the first movable member in the first direction, and a second coil and a second magnet that generate a propulsive force for moving the second movable member in the second direction, in which the first coil or the first magnet is defined as a first drive element, and the second coil or the second magnet is defined as a second drive element, in the third direction, a surface of the second movable member on the opposite side to the fixing member side is defined as a first surface of the second movable member, in the third direction, a surface of the second movable member on the fixing member side is defined as a second surface of the second movable member, the first drive element is provided on the second movable member to be closer to the fixing member side than the first surface, and the second drive element is provided on the second movable member to be closer to the opposite side to the fixing member side than the second surface.

(16) An image blur correcting device that corrects a blur of a captured image captured by an imaging element that images a subject through an imaging optical system, the device comprising a fixing member, a first movable member that is supported by the fixing member in a state of being movable in a first direction, a second movable member that is supported by the first movable member in a state of being movable in a second direction intersecting the first direction and is disposed to be closer to a fixing member side than the first movable member in a third direction perpendicular to the first direction and the second direction, a correction lens that is included in the imaging element fixed to the second movable member or the imaging optical system fixed to the second movable member, a first coil and a first magnet that generate a propulsive force for moving the first movable member in the first direction, and a second coil and a second magnet that generate a propulsive force for moving the second movable member in the second direction, in which the first coil or the first magnet is defined as a first drive element, and the second coil or the second magnet is defined as a second drive element, in the third direction, a surface of the second movable member on the fixing member side is defined as a second surface of the second movable member, in the third direction, a surface of the second movable member on an opposite side to the fixing member side is defined as a first surface of the second movable member, the first drive element is provided on the second movable member to be closer to the opposite side to the fixing member side than the second surface, and the second drive element is provided on the second movable member to be closer to the fixing member side than the first surface.

(17) The image blur correcting device according to (15) or (16), in which the first drive element is fixed to the first movable member, and the second drive element is fixed to the second movable member.

(18) A lens device comprising the image blur correcting device according to any one of (1) to (17).

(19) An imaging device comprising the lens device according to (18), and an imaging element that images a subject through the lens device.

The present invention is particularly convenient and effective in a case of being applied to a commercial camera, a digital camera, or the like.

EXPLANATION OF REFERENCES 100, 200: image blur correcting device
10, 10A: fixing member
11, 11A: lens
20, 60: first movable member
20a, 30a, 50a, 60a: first surface
20b, 30b, 50b, 60b: second surface
21, 61: opening
30, 50: second movable member
31, 51: correction lens
40, 40A: facing base
41, 41A: opening
12, 13, 14, 15: first guide member
24, 25, 64, 65: second guide member
22, 32, 52, 62: bearing
23, 33, 53, 63: engagement portion
M1, m1: first magnet
C1, c1: first coil
Y1, Y11, y1: first yoke M2, m2: second magnet
C2, c2: second coil
Y2, Y22, y2: second yoke
H1, H2: height adjusting member

What is claimed is:

1. An image blur correcting device that corrects a blur of a captured image captured by an imaging element that images a subject through an imaging optical system, the device comprising:
   a fixing member;
   a first movable member that is supported by the fixing member in a state of being movable in a first direction;
   a second movable member that is supported by the first movable member in a state of being movable in a second direction intersecting the first direction;
   a correction lens that is included in the imaging element fixed to the second movable member or the imaging optical system fixed to the second movable member;
   a first coil and a first magnet that generate a propulsive force for moving the first movable member in the first direction; and
   a second coil and a second magnet that generate a propulsive force for moving the second movable member in the second direction,
   wherein, of the first movable member and the second movable member, a movable member that is relatively far from the fixing member in a third direction perpendicular to the first direction and the second direction is defined as a distant movable member, and a movable member that is relatively close to the fixing member is defined as a near movable member,
   the first coil or the first magnet is defined as a first drive element, and the second coil or the second magnet is defined as a second drive element,
   in the third direction, a surface of the distant movable member or the near movable member on an opposite side to a fixing member side is defined as a first surface of the distant movable member or the near movable member,
   in the third direction, a surface of the distant movable member or the near movable member on the fixing member side is defined as a second surface of the distant movable member or the near movable member,
   one of the first drive element and the second drive element is provided on the distant movable member or the near movable member to be closer to the fixing member side than the first surface, and
   the other of the first drive element and the second drive element is provided on the distant movable member or the near movable member to be closer to the opposite side to the fixing member side than the second surface.

2. The image blur correcting device according to claim 1, wherein the first drive element and the second drive element are each fixed to the distant movable member or the near movable member.

3. The image blur correcting device according to claim 2, wherein the one of the first drive element and the second drive element has a portion that protrudes from the second surface of the distant movable member or the near movable member.

4. The image blur correcting device according to claim 2, wherein the other of the first drive element and the second drive element has a portion that protrudes from the first surface of the distant movable member or the near movable member.

5. The image blur correcting device according to claim 2, further comprising a facing fixing member that faces the fixing member with the distant movable member and the near movable member interposed therebetween,
wherein the first coil and the second coil are fixed to the distant movable member or the near movable member,
the first magnet is fixed to the fixing member or the facing fixing member at a position facing the first coil, and
the second magnet is fixed to the facing fixing member or the fixing member at a position facing the second coil.

6. The image blur correcting device according to claim 1, wherein one of the first drive element and the second drive element is fixed to the near movable member, and is provided on the near movable member to be closer to the fixing member side than the first surface, and
the other of the first drive element and the second drive element is fixed to the distant movable member, and is provided on the distant movable member to be closer to the opposite side to the fixing member side than the second surface.

7. The image blur correcting device according to claim 6, wherein the one of the first drive element and the second drive element has a portion that protrudes from the second surface of the near movable member.

8. The image blur correcting device according to claim 6, wherein the other of the first drive element and the second drive element has a portion that protrudes from the first surface of the distant movable member.

9. The image blur correcting device according to claim 6, wherein a guide member that guides movement of the distant movable member or the near movable member is fixed to the first surface of the near movable member or the second surface of the distant movable member, and
a part of the guide member and the first drive element overlap each other as viewed in the third direction.

10. The image blur correcting device according to claim 6,
wherein two first guide members that guide movement of the first movable member in the first direction and extend in the first direction are fixed to the fixing member, and
one of the two first guide members and the second drive element are arranged in the first direction as viewed in the third direction.

11. The image blur correcting device according to claim 10,
wherein the first coil is fixed to the near movable member, the second coil is fixed to the distant movable member, the first magnet is fixed to the fixing member at a position facing the first coil, and
the second magnet is fixed at a position facing the second coil on an opposite side to a near movable member side.

12. The image blur correcting device according to claim 11,
wherein a yoke that prevents a magnetic flux leakage of the second magnet is fixed to a back surface of the second coil of the distant movable member, or the first surface of the near movable member at a position facing the second coil.

13. The image blur correcting device according to claim 10,
wherein the second coil is fixed to the near movable member,
the first coil is fixed to the distant movable member,
the second magnet is fixed to the fixing member at a position facing the second coil, and
the first magnet is fixed at a position facing the first coil on an opposite side to a near movable member side.

14. The image blur correcting device according to claim 13,
wherein a yoke that prevents a magnetic flux leakage of the second magnet is fixed to a back surface of the second coil of the near movable member, or the second surface of the distant movable member at a position facing the second coil.

15. An image blur correcting device that corrects a blur of a captured image captured by an imaging element that images a subject through an imaging optical system, the device comprising:
a fixing member;
a first movable member that is supported by the fixing member in a state of being movable in a first direction;
a second movable member that is supported by the first movable member in a state of being movable in a second direction intersecting the first direction and is disposed to be closer to an opposite side to a fixing member side than the first movable member in a third direction perpendicular to the first direction and the second direction;
a correction lens that is included in the imaging element fixed to the second movable member or the imaging optical system fixed to the second movable member;
a first coil and a first magnet that generate a propulsive force for moving the first movable member in the first direction; and
a second coil and a second magnet that generate a propulsive force for moving the second movable member in the second direction,
wherein the first coil or the first magnet is defined as a first drive element, and the second coil or the second magnet is defined as a second drive element,
in the third direction, a surface of the second movable member on the opposite side to the fixing member side is defined as a first surface of the second movable member,
in the third direction, a surface of the second movable member on the fixing member side is defined as a second surface of the second movable member,
the first drive element is provided on the second movable member to be closer to the fixing member side than the first surface, and
the second drive element is provided on the second movable member to be closer to the opposite side to the fixing member side than the second surface.

16. The image blur correcting device according to claim 15,
wherein the first drive element is fixed to the first movable member, and
the second drive element is fixed to the second movable member.

17. An image blur correcting device that corrects a blur of a captured image captured by an imaging element that images a subject through an imaging optical system, the device comprising:
a fixing member;
a first movable member that is supported by the fixing member in a state of being movable in a first direction;
a second movable member that is supported by the first movable member in a state of being movable in a second direction intersecting the first direction and is disposed to be closer to a fixing member side than the first movable member in a third direction perpendicular to the first direction and the second direction;

a correction lens that is included in the imaging element fixed to the second movable member or the imaging optical system fixed to the second movable member;

a first coil and a first magnet that generate a propulsive force for moving the first movable member in the first direction; and a second coil and a second magnet that generate a propulsive force for moving the second movable member in the second direction, wherein the first coil or the first magnet is defined as a first drive element, and the second coil or the second magnet is defined as a second drive element, in the third direction, a surface of the second movable member on the fixing member side is defined as a second surface of the second movable member, in the third direction, a surface of the second movable member on an opposite side to the fixing member side is defined as a first surface of the second movable member, the first drive element is provided on the second movable member to be closer to the opposite side to the fixing member side than the second surface, and the second drive element is provided on the second movable member to be closer to the fixing member side than the first surface.

18. A lens device comprising the image blur correcting device according to claim 1.

19. An imaging device comprising:

the lens device according to claim 18; and an imaging element that images a subject through the lens device.

* * * * *